(12) United States Patent
Ieda et al.

(10) Patent No.: US 9,228,057 B2
(45) Date of Patent: Jan. 5, 2016

(54) POLYAMIDE, POLYAMIDE COMPOSITION, AND MOLDED ARTICLE

(71) Applicant: ASAHI KASEI CHEMICALS CORPORATION, Tokyo (JP)

(72) Inventors: Shinji Ieda, Tokyo (JP); Koichi Nagase, Tokyo (JP); Yu Nitto, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 0 days.

(21) Appl. No.: 14/411,174

(22) PCT Filed: Jul. 9, 2013

(86) PCT No.: PCT/JP2013/068786
§ 371 (c)(1),
(2) Date: Dec. 24, 2014

(87) PCT Pub. No.: WO2014/010607
PCT Pub. Date: Jan. 16, 2014

(65) Prior Publication Data
US 2015/0175744 A1  Jun. 25, 2015

(30) Foreign Application Priority Data

Jul. 9, 2012  (JP) .................................. 2012-153841
May 8, 2013 (JP) .................................. 2013-098837

(51) Int. Cl.
*C08G 69/26* (2006.01)
*C08L 77/06* (2006.01)
*C08G 69/36* (2006.01)
*C08K 7/14* (2006.01)

(52) U.S. Cl.
CPC ............. *C08G 69/26* (2013.01); *C08G 69/265* (2013.01); *C08G 69/36* (2013.01); *C08K 7/14* (2013.01); *C08L 77/06* (2013.01)

(58) Field of Classification Search
CPC .......... C08G 69/26; C08G 9/28; C08G 69/36; C08G 69/265; H01L 33/60; C08K 5/3435; C08K 3/22; C08K 7/14; C08L 77/06
See application file for complete search history.

(56) References Cited

U.S. PATENT DOCUMENTS

| | | | |
|---|---|---|---|
| 5,378,800 A | 1/1995 | Mok et al. | |
| 5,965,689 A | 10/1999 | Koning et al. | |
| 6,172,178 B1 | 1/2001 | Koning et al. | |
| 2004/0049006 A1 | 3/2004 | Aramaki et al. | |
| 2010/0173139 A1 | 7/2010 | Miyoshi et al. | |
| 2011/0301290 A1* | 12/2011 | Kato et al. | 524/606 |
| 2012/0228564 A1* | 9/2012 | Hashimoto et al. | 252/582 |
| 2013/0261256 A1 | 10/2013 | Ieda et al. | |
| 2013/0281655 A1 | 10/2013 | Shikano et al. | |
| 2014/0194570 A1 | 7/2014 | Kato et al. | |

FOREIGN PATENT DOCUMENTS

| | | |
|---|---|---|
| JP | S64-002131 A | 1/1989 |
| JP | H06-503590 A | 4/1994 |
| JP | H09-012868 A | 1/1997 |
| JP | H11-512476 A | 10/1999 |
| JP | 2001-514695 A | 9/2001 |
| JP | 2011-021128 A | 2/2011 |
| JP | 2011-068874 A | 4/2011 |
| JP | 2011-074361 A | 4/2011 |
| JP | 2011-219697 A | 11/2011 |
| WO | 02-48239 A | 2/2002 |
| WO | 2008-149862 A | 12/2008 |
| WO | 2009-113590 A1 | 9/2009 |
| WO | WO 2011/030746 * | 3/2011 |
| WO | 2012-093722 A1 | 7/2012 |
| WO | 2013-024593 A | 2/2013 |

OTHER PUBLICATIONS

Dotson et al, Polymerization Process Modeling, John Wilet & Sons, Incs, New York, 1996, p. 39.*
L. H. Sperling, "Introduction to Physical Polymer Science", John Wiley & Sons, Inc, New York, New York, pp. 6-7, 97-99 (1992).*
International search report issued with respect to application No. PCT/JP2013/068786 mail date is Sep. 10, 2013.
International preliminary report on patentability issued with respect to application No. PCT/JP2013/068786, mail date is Nov. 7, 2014.
European search report issued for application No. 13816545.1, mail date is May 28, 2015.

* cited by examiner

*Primary Examiner* — Alexander Kollias
(74) *Attorney, Agent, or Firm* — Greenblum & Bernstein, P.L.C.

(57) ABSTRACT

A polyamide comprising a unit containing at least one (a) alicyclic dicarboxylic acid and a unit containing a (b) diamine having 8 or more carbon atoms, wherein the polyamide satisfies the following conditions (1) and (2): (1) a sulfuric acid relative viscosity $\eta r$ at 25° C. is 2.3 or more; and (2) Mw (weight average molecular weight)/Mn (number average molecular weight) is 4.0 or less.

28 Claims, No Drawings

POLYAMIDE, POLYAMIDE COMPOSITION, AND MOLDED ARTICLE

TECHNICAL FIELD

The present invention relates to a polyamide, a polyamide composition, and a molded article.

BACKGROUND ART

Polyamides represented by polyamide 6 and polyamide 66 (hereinafter, sometimes abbreviated as "PA6" and "PA66" respectively) or the like have excellent fabricability, mechanical properties, and chemical resistance. Therefore, the polyamides are widely used as a material for various parts, such as for automobiles, electric and electronic parts, industrial materials, engineering materials, and daily and household articles.

In the automobile industry, as an environmental measure, there is a need to lighten the weight of the automobile body in order to reduce exhaust gases. To respond to this need, the polyamides are increasingly used as exterior materials and interior materials or the like for the automobiles, instead of metals. The level of the properties required for the polyamides used as the exterior materials and interior materials or the like for the automobiles, such as heat resistance, strength, and surface appearance, is further increased.

Of these, since the temperature in an engine room tends to increase, the need to increase the heat resistance of a polyamide used for materials in the engine room is growing stronger.

In the electric and electronics industry, such as household appliances, lead-free surface-mount (SMT) solder is advanced. There is a need for increased heat resistance for the polyamide which is used as materials for the household appliances or the like, and can withstand the increased melting point of the solder caused by the lead-free of the solder.

On the one hand, the polyamides such as PA6 and PA66 cannot satisfy these requirements in terms of heat resistance, since their melting point is low.

To resolve the above-described problems with conventional polyamides such as PA6 and PA66, a high-melting-point polyamide has been proposed. Specifically, a polyamide (hereinafter, sometimes abbreviated as "PA6T") formed from terephthalic acid and hexamethylenediamine has been proposed.

However, the PA6T is a high-melting-point polyamide having a melting point of about 370° C. Therefore, even if a molded article is obtained from the PA6T by melt molding, pyrolysis of the polyamide is severe, which makes it difficult to obtain a molded article having sufficient properties.

To resolve the above-described problem with the PA6T, a high-melting-point semi-aromatic polyamide (hereinafter, sometimes abbreviated as "a 6T-based copolymer polyamide") or the like having terephthalic acid and hexamethylenediamine as main components has been proposed. This high-melting-point semi-aromatic polyamide is obtained by copolymerizing an aliphatic polyamide, such as PA6 and PA66, or an amorphous aromatic polyamide (hereinafter, sometimes abbreviated as "PA6I") formed from isophthalic acid and hexamethylenediamine, or the like with the PA6T, and has a melting point lowered to about 220 to 340° C.

As the 6T-based copolymer polyamide, Patent Literature 1 discloses an aromatic polyamide (hereinafter, sometimes abbreviated as "PA6T/2MPDT") which is formed from an aromatic dicarboxylic acid and an aliphatic diamine, in which the aliphatic diamine is a mixture of hexamethylenediamine and 2-methylpentamethylenediamine.

In contrast to an aromatic polyamide formed from an aromatic dicarboxylic acid and an aliphatic diamine, a high-melting-point aliphatic polyamide (hereinafter, sometimes abbreviated as "PA46") formed from adipic acid and tetramethylenediamine, and an alicyclic polyamide formed from an alicyclic dicarboxylic acid and an aliphatic diamine, or the like have been proposed.

Patent Literatures 2 and 3 disclose a semi-alicyclic polyamide (hereinafter, sometimes abbreviated as "PA6C copolymer polyamide") formed from an alicyclic polyamide (hereinafter, sometimes abbreviated as "PA6C") formed from 1,4-cyclohexanedicarboxylic acid and hexamethylenediamine, and another polyamide.

Patent Literature 2 discloses that electric and electronic members formed from a semi-alicyclic polyamide blended with 1 to 40% of 1,4-cyclohexanedicarboxylic acid as a dicarboxylic acid unit have heat resistance which can resist a temperature under solder conditions.

Patent Literature 3 discloses that automobile parts produced from a polyamide composition substantially consisting of a unit derived from an aliphatic dicarboxylic acid and an aliphatic diamine have excellent fluidity and toughness or the like.

Patent Literature 4 discloses that a polyamide formed from a dicarboxylic acid unit containing 1,4-cyclohexanedicarboxylic acid and a diamine unit containing 2-methyl-1,8-octanediamine has excellent light resistance, toughness, moldability, low weight, and heat resistance or the like. As a production method for the polyamide, Patent Literature 4 discloses that a polyamide having a melting point of 311° C. is produced by reacting 1,4-cyclohexanedicarboxylic acid and 1,9-nonanediamine at 230° C. or less to produce a prepolymer, which is then subjected to solid phase polymerization at 230° C.

Patent Literature 5 discloses that a polyamide using 1,4-cyclohexanedicarboxylic acid having a trans/cis ratio of from 50/50 to 97/3 as a raw material has excellent heat resistance, low water absorbance, and light resistance or the like.

Patent Literature 6 discloses a polyamide formed by polymerizing 1,4-cyclohexanedicarboxylic acid and a diamine having a substituent branched from a main chain.

Patent Literature 7 discloses a polyamide formed by polymerizing 1,4-cyclohexanedicarboxylic acid, undecamethylenediamine, and 1,6-diaminohexane.

Patent Literature 8 discloses a polyamide formed by polymerizing 1,4-cyclohexanedicarboxylic acid, 1,12-diaminododecane, and 1,6-diaminohexane.

Patent Literature 9 discloses a copolymer polyamide formed by polymerizing an alicyclic dicarboxylic acid, a diamine, and a predetermined copolymer component.

CITATION LIST

Patent Literature

Patent Literature 1: National Publication of International Patent Application No. H06-503590
Patent Literature 2: National Publication of International Patent Application No. H11-512476
Patent Literature 3: National Publication of International Patent Application No. 2001-514695
Patent Literature 4: Japanese Patent Laid-Open No. H09-12868
Patent Literature 5: International publication No. WO 2002/048239
Patent Literature 6: International publication No. WO 2009/113590

Patent Literature 7: Japanese Patent Publication No. 564-2131
Patent Literature 8: International publication No. WO 2008/149862
Patent Literature 9: International publication No. WO 2012/093722

SUMMARY OF INVENTION

Technical Problem

However, although the 6T-based copolymer polyamide certainly has properties such as low water absorbance, high heat resistance, and high chemical resistance, fluidity is low, and moldability and sufficient properties in the surface appearance of the molded article are not obtained. Furthermore, their toughness and light resistance is poor. Consequently, there is a need for improvement for applications which require a good molded article surface appearance and light resistance, such as an exterior part. The 6T-based copolymer polyamide has a large specific weight, so that there is a need for improvement in terms of reducing weight as well.

Although the PA6T/2MPDT disclosed in Patent Literature 1 can partially improve the problems of conventional PA6T copolymer polyamide, the level of improvement in terms of fluidity, moldability, toughness, molded article surface appearance, and light resistance is insufficient.

Although the PA46 has good heat resistance and moldability, the PA46 suffers from the problems of a high water absorption rate. Furthermore, the dimensional change and deterioration in mechanical properties due to water absorption are very large. In some cases, the PA46 cannot satisfy the dimensional change requirement required for automobile applications or the like.

The PA6C copolymer polyamide disclosed in Patent Literatures 2 and 3 also suffers from problems such as a high water absorption rate and insufficient fluidity.

For the polyamides disclosed in Patent Literatures 4 and 5 too, the improvement in terms of plasticizing time stability, vibration fatigue resistances, slidability, and surface appearance is insufficient.

The polyamide disclosed in Patent Literature 6 suffers from the problems of a high water absorption rate and a phenomenon of pellets blocking one another in handling the pellets, particularly in transporting them, in some cases, there is a need for improvement in terms of low water absorbance, low blocking properties, and mold release properties.

As for the polyamide disclosed in Patent Literature 7, there is a need for improvement in terms of low blocking properties, plasticizing time stability, and surface appearance, in some cases.

As for the polyamide disclosed in Patent Literature 8, there is a need for improvement in terms of plasticizing time stability, vibration fatigue resistances, slidability, surface appearance, and continuous productivity in some cases.

As for the polyamide disclosed in Patent Literature 9, there is a need for improvement in terms of vibration fatigue resistances and slidability in some cases.

Furthermore, if the molecular weight of the conventionally known polyamide having a high melting point is increased in order to improve long-term properties such as vibration fatigue resistances and slidability, the rate of polyamide molecules having a three-dimensional structure tends to be extremely increased, which makes it difficult to increase the molecular weight while maintaining good fluidity, and disadvantageously decreases polymerization yield in melt polymerization remarkably. Since continuous production is practically carried out in a state where the polyamide having a three-dimensional structure remains, the polyamide having a three-dimensional structure gelates, which causes black dots, and disadvantageously deteriorates the quality remarkably in the practical view.

Furthermore, if a polyamide pellet in which the rate of the polyamide molecules having a three-dimensional structure obtained by polymerization is high is subjected to high-temperature processing by an extrusion machine or a molding machine or the like, the three-dimensional structure of the polyamide molecules is further advanced, which disadvantageously causes unstable flow properties.

Therefore, an object of the present invention is to provide a polyamide which has excellent strength, high-temperature strength, low water absorbance, low blocking properties, mold release properties, plasticizing time stability, slidability, and polymerization yield in melt polymerization, and a polyamide composition which has excellent vibration fatigue resistances and surface appearance.

Solution to Problem

As a result of continued intensive investigations into resolving the above-described problems, the present inventors have discovered that a polyamide containing a unit containing a specific dicarboxylic acid and a unit containing a specific diamine and satisfying specific requirements in a sulfuric acid relative viscosity ηr and Mw (weight average molecular weight)/Mn (number average molecular weight) can resolve the above-described problems, thereby arriving at the present invention.

More specifically, the present invention is as follows.

[1]
A polyamide comprising:
a unit comprising at least one (a) alicyclic dicarboxylic acid; and
a unit comprising a (b) diamine having 8 or more carbon atoms,
wherein the polyamide satisfies the following conditions (1) and (2):
(1) a sulfuric acid relative viscosity ηr at 25° C. is 2.3 or more; and
(2) Mw (weight average molecular weight)/Mn (number average molecular weight) is 3.0 or less.
[2]
The polyamide according to [1], wherein the polyamide has a peak melting temperature of $T_{pm-1}$ of 280° C. or more.
[3]
The polyamide according to [1] or [2], wherein the (a) alicyclic dicarboxylic acid is 1,4-cyclohexanedicarboxylic acid.
[4]
The polyamide according to any one of [1] to [3], wherein a trans isomer ratio of a portion derived from the (a) alicyclic dicarboxylic acid is 65 to 80 mol %.
[5]
The polyamide according to any one of [1] to [4], wherein a ratio ($\eta^*1/\eta^*100$) of a shear viscosity ($\eta^*1$) at an angular velocity of 1 rad/s to a shear viscosity ($\eta^*100$) at an angular velocity of 100 rad/s is 3 or less.
[6]
The polyamide according to any one of [1] to [5], wherein Tg is 90° C. or more.
[7]
The polyamide according to any one of [1] to [6], wherein Tg is 115° C. or more.

[8]
The polyamide according to any one of [1] to [7], wherein in a differential scanning calorimetry based on JIS-K7121, a difference ($T_{pc-1}$–Tg) between a crystallization peak temperature $T_{pc-1}$ obtained in decreasing a temperature at 20° C/min and a glass transition temperature Tg is 140° C or more.

[9]
The polyamide according to any one of [1] to [8], wherein the polyamide further comprises a unit comprising at least one (c) copolymer component selected from the group consisting of the following (c-1) to (c-3):
a (c-1) dicarboxylic acid other than the (a) alicyclic dicarboxylic acid;
a (c-2) diamine having number of carbon atoms equal to or less than that of the (b) diamine and being other than the (b) diamine; and
a (c-3) lactam and/or aminocarboxylic acid.

[10]
The polyamide according to any one of [1] to [9], wherein the (b) diamine having 8 or more carbon atoms is decamethylenediamine.

[11]
The polyamide according to [9] or [10], wherein the (c-2) diamine having the number of carbon atoms equal to or less than that of the (b) diamine and being other than the (b) diamine is an aliphatic diamine having 4 to 9 carbon atoms.

[12]
The polyamide according to any one of [9] to [11], wherein the (c-2) diamine having the number of carbon atoms equal to or less than that of the (b) diamine and being other than the (b) diamine is an aliphatic diamine having an even number of carbon atoms.

[13]
The polyamide according to any one of [1] to [12], wherein the (c-2) diamine having the number of carbon atoms equal to or less than that of the (b) diamine and being other than the (b) diamine is at least one selected from the group consisting of 1,6-hexamethylenediamine and 2-methylpentamethylenediamine.

[14]
The polyamide according to any one of [1] to [13], wherein a ratio between the number of carbon atoms and the number of amide groups (carbon atom number/amide group number) is 8 or more.

[15]
The polyamide according to any one of [1] to [14], wherein in a differential scanning calorimetry based on JIS-K7121, a difference ($T_{pc-1}$–$T_{pc-2}$) between a crystallization peak temperature $T_{pc-1}$ obtained in decreasing a temperature at 20° C./min and a crystallization peak temperature $T_{pc-2}$ obtained in decreasing the temperature again at 50° C./min after measuring the crystallization peak temperature $T_{pc-1}$ is 10° C. or less.

[16]
The polyamide according to any one of [9] to [15], wherein a content of the (c) copolymer component is 7.5 mol % or more and 20.0 mol % or less based on 100 mol % of a total amount of all constituent components of the polyamide.

[17]
The polyamide according to any one of [1] to [16], wherein the polyamide is obtained by carrying out a solid phase polymerization step in at least a part of a polymerization step.

[18]
The polyamide according to any one of [1] to [17], wherein the polyamide has a biomass plastic ratio of 25% or more.

[19]
A polyamide composition comprising:
the polyamide according to any one of [1] to [18]; and
at least one component selected from the group consisting of an inorganic filler, a nucleating agent, a lubricant, a stabilizer, and a polymer other than the polyamide.

[20]
A polyamide composition comprising:
the polyamide according to any one of [1] to [18]; and
a glass fiber having a number average fiber diameter of 3 to 9 µm.

[21]
A molded article comprising the polyamide according to any one of [1] to [18] or the polyamide composition according to [19] or [20].

[22]
A sliding part comprising the polyamide according to any one of [1] to [18] or the polyamide composition according to [19] or [20].

[23]
The molded article according to [21], wherein the molded article is any of selected from the group consisting of an automobile part, an electronic part, a household appliance part, an OA equipment part, and a mobile equipment part.

[24]
The molded article according to [21], wherein the molded article is a reflector for a light emitting device.

Advantageous Effects of Invention

According to the present invention, a polyamide which has excellent strength, high-temperature strength, low water absorbance, low blocking properties, mold release properties, plasticizing time stability, slidability, and polymerization yield in melt polymerization, and a polyamide composition which has excellent vibration fatigue resistances and surface appearance can be provided.

DESCRIPTION OF EMBODIMENTS

Hereinafter, embodiments for carrying out the present invention (hereinafter, simply referred to as a "present embodiment") will be described in detail. The present embodiment below is exemplification for describing the present invention, and is not intended to limit the present invention to the contents given below. Within the scope of the gist, the present invention can be modified in various ways and implemented.

[Polyamide]

The polyamide according to the present embodiment is a polyamide comprising:
a unit comprising at least one (a) alicyclic dicarboxylic acid; and
a unit comprising a (b) diamine having 8 or more carbon atoms,
wherein the polyamide satisfies the following conditions (1) and (2):
(1) a sulfuric acid relative viscosity ηr at 25° C. is 2.3 or more; and
(2) Mw (weight average molecular weight)/Mn (number average molecular weight) is 3.0 or less.

In the present embodiment, the polyamide means a polymer which has an amide (—NHCO—) bond in a main chain.

In the present embodiment, a dicarboxylic acid is not limited to a dicarboxylic acid itself. The dicarboxylic acid may be a compound equivalent to the dicarboxylic acid.

The compound equivalent to the dicarboxylic acid is not particularly limited as long as the compound has a dicarboxylic acid structure derived from the dicarboxylic acid or can form the dicarboxylic acid structure. Examples thereof include anhydrides and halides of the dicarboxylic acid.

Hereinafter, the components (a) and (b) will be described in detail.

((a) Alicyclic Dicarboxylic Acid)

The polyamide according to the present embodiment contains a unit comprising an (a) alicyclic dicarboxylic acid.

Examples of the (a) alicyclic dicarboxylic acid used in the present embodiment (hereinafter, also referred to as "cycloaliphatic dicarboxylic acid", and may be described as an (a) component or (a), herein) include, but are not limited to, an alicyclic dicarboxylic acid having an alicyclic structure with 3 to 10 carbon atoms. Preferable examples thereof include an alicyclic dicarboxylic acid having an alicyclic structure with 5 to 10 carbon atoms. Examples of the (a) alicyclic dicarboxylic acid include, but are not limited to, 1,4-cyclohexanedicarboxylic acid, 1,3-cyclohexanedicarboxylic acid, and 1,3-cyclopentanedicarboxylic acid.

The (a) alicyclic dicarboxylic acid used in the present embodiment may be unsubstituted or have a substituent.

Examples of the substituents include, but are not limited to, an alkyl group having 1 to 4 carbon atoms, such as a methyl group, an ethyl group, an n-propyl group, an isopropyl group, an n-butyl group, an isobutyl group, and a tert-butyl group.

From the viewpoints of heat resistance, low water absorbance, strength, and rigidity of the polyamide according to the present embodiment, 1,4-cyclohexanedicarboxylic acid is preferable as the (a) alicyclic dicarboxylic acid used in the present embodiment.

As the (a) alicyclic dicarboxylic acid used in the present embodiment, one kind may be used alone, or two or more kinds may be used in combination.

The alicyclic dicarboxylic acids have trans and cis geometric isomers. The alicyclic dicarboxylic acid used as a raw material monomer may be either a trans or a cis isomer. The alicyclic dicarboxylic acid may also be used as a mixture of trans and cis isomers in various ratios.

Since the alicyclic dicarboxylic acids isomerize in a fixed ratio at high temperatures, and the cis isomer has a higher water solubility than that of the trans isomer in an equivalent amount of salt with a diamine, in the alicyclic dicarboxylic acid used as the raw material monomer used in the present embodiment, a trans isomer/cis isomer ratio is, based on molar ratio, preferably 50/50 to 0/100, more preferably 40/60 to 10/90, and still more preferably 35/65 to 15/85.

The alicyclic dicarboxylic acid trans isomer/cis isomer ratio (molar ratio) can be determined by liquid chromatography (HPLC) or nuclear magnetic resonance spectroscopy (NMR). Herein, a trans isomer/cis isomer ratio (molar ratio) can be determined by $^1$H-NMR.

((b) Diamine Having 8 or More Carbon Atoms)

The polyamide according to the present embodiment contains a unit comprising a (b) diamine having 8 or more carbon atoms.

The (b) diamine having 8 or more carbon atoms used in the present embodiment (may be described as a (b) component, a (b) diamine, or (b), herein) is not particularly limited as long as it is a diamine having 8 or more carbon atoms, and may be an unsubstituted straight-chain aliphatic diamine, a branched aliphatic diamine having a substituent of, for example, an alkyl group having 1 to 4 carbon atoms, such as a methyl group, an ethyl group, an n-propyl group, an isopropyl group, an n-butyl group, an isobutyl group or a tert-butyl group, an alicyclic diamine, or an aromatic diamine.

The carbon atom number of the (b) diamine having 8 or more carbon atoms used in the present embodiment is 8 or more from the viewpoint of low water absorbance (water absorbance is reduced). The carbon atom number of the (b) diamine is 20 or less, i.e., preferably 8 to 20, more preferably 8 to 15, and still more preferably 8 to 12 from the viewpoint of increasing high-temperature strength and a melting point.

Examples of the (b) aliphatic diamine having 8 or more carbon atoms used in the present embodiment include, but are not limited to, octamethylenediamine, 2-methyloctamethylenediamine, nonamethylenediamine, decamethylenediamine, undecamethylenediamine, dodecamethylenediamine, tridecamethylenediamine, 2,2,4-trimethylhexamethylenediamine, 2,4,4-trimethylhexamethylenediamine, 2-methyloctamethylenediamine, 2,4-dimethyloctamethylenediamine, metaxylylenediamine, ortho-xylylenediamine, and paraxylylenediamine.

From the viewpoints of heat resistance, low water absorbance, strength, and rigidity or the like, the (b) aliphatic diamine having 8 or more carbon atoms used in the present embodiment is preferably octamethylenediamine, 2-methyloctamethylenediamine, nonamethylenediamine, decamethylenediamine, undecamethylenediamine, and dodecamethylenediamine, more preferably 2-methyloctamethylenediamine, nonamethylenediamine, decamethylenediamine, undecamethylenediamine, and dodecamethylenediamine, and still more preferably decamethylenediamine and dodecamethylenediamine, and yet still more preferably decamethylenediamine.

The decamethylenediamine is preferably 1,10-decamethylenediamine having a straight-chain decane skeleton having an amino group in 1,10-positions from the viewpoint of further improving the crystallinity.

The 1,10-decamethylenediamine is preferable also from the viewpoint of a biomass-derived raw material.

The decamethylenediamine may be unsubstituted 1,10-decamethylenediamine or substituted 1,10-decamethylenediamine having a substituent. Examples of the substituent include, but are not particularly limited to, an alkyl group having 1 to 4 carbon atoms, such as a methyl group, an ethyl group, an n-propyl group, an isopropyl group, an n-butyl group, an isobutyl group, and a tert-butyl group.

Examples of the alicyclic diamines (also referred to as cycloaliphatic diamines) include, but are not limited to, 1,4-cyclohexanediamine, 1,3cyclohexanediamine, and 1,3-cyclopentanediamine.

The aromatic diamine is a diamine containing an aromatic group. Examples of the aromatic diamines include, but are not limited to, meta-xylylenediamine, ortho-xylylenediamine, and para-xylylendiamine.

As the (b), one kind may be used alone, or two or more kinds may be used in combination.

If two or more diamines having 8 or more carbon atoms are used in combination in the present embodiment, a diamine having the most carbon atoms is regarded as the (b) component, with the other diamine(s) having 8 or more carbon atoms regarded as a (c-2) component described below.

((c) Copolymer Component)

The polyamide according to the present embodiment can contain a predetermined (c) copolymer component (may be described as a (c) component or (c), herein) besides the (a) and (b), within a range which does not impair the purpose of the present embodiment.

The (c) copolymer component is at least one selected from the group consisting of a (c-1) dicarboxylic acid other than that of the alicyclic dicarboxylic acid (may be described as a (c-1) component or (c-1), herein), a (c-2) diamine having number of carbon atoms equal to or less than that of the (b) diamine and being other than the (b) diamine (may be described as a (c-2) component or (c-2), herein), and a (c-3) lactam and/or aminocarboxylic acid (may be described as a (c-3) component or (c-3), herein).

As the (c) copolymer component to be combined with the (a) alicyclic dicarboxylic acid and the (b) diamine having 8 or more carbon atoms, only one kind may be used alone, or two or more kinds may be used in combination.

As for exemplary combinations, the (c-1), (c-2), and (c-3) may be freely combined, and for example, two kinds of the (c-1) may be used, two kinds of the (c-2) or (c-3) may be combined, or one kind of the (c-1) and one kind of the (c-2) may be combined.

The content of the (c) copolymer component in the polyamide according to the present embodiment is preferably 5.0 mol % or more and 22.5 mol % or less, more preferably 7.5 mol % or more and 20.0 mol % or less, and still more preferably 10.0 mol % or more and 18.0 mol % or less, based on 100 mol % of the total amount of all constituent components of the polyamide.

By setting the content of the (c) copolymer component to be within the range, a polyamide which has excellent strength, high-temperature strength, low water absorbance, low blocking properties, mold release properties, and plasticizing time stability can be obtained. A polyamide composition comprising the polyamide has excellent vibration fatigue resistances and surface appearance.

<(c-1) Dicarboxylic Acid Other than the (a) Alicyclic Dicarboxylic Acid>

Examples of the (c-1) dicarboxylic acid other than the (a) alicyclic dicarboxylic acid include, but are not limited to, aliphatic dicarboxylic acids and aromatic dicarboxylic acids.

Examples of the aliphatic dicarboxylic acids include, but are not limited to, straight-chain or branched aliphatic dicarboxylic acids having 3 to 20 carbon atoms, such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyl adipic acid, pimelic acid, suberic acid, azelaic acid, sebacic acid, dodecanedioic acid, tetradecanedioic acid, hexadecanedioic acid, octadecanedioic acid, eicosane diacid, and diglycolic acid.

Examples of the aromatic dicarboxylic acids include, but are not limited to, aromatic dicarboxylic acids, which are unsubstituted or substituted with various substituents and have 8 to 20 carbon atoms, such as terephthalic acid, isophthalic acid, naphthalene dicarboxylic acid, 2-chloroterephthalic acid, 2-methylterephthalic acid, 5-methylisophthalic acid, and 5-sodium sulfoisophthalic acid.

Examples of the various substituents include, but are not limited to, an alkyl group having 1 to 4 carbon atoms, an aryl group having 6 to 10 carbon atoms, an arylalkyl group having 7 to 10 carbon atoms, a halogen group such as a chloro group or a bromo group, a silyl group having 1 to 6 carbon atoms, and a sulfonic acid group or salt thereof, such as a sodium salt.

As the (c-1) dicarboxylic acid other than the (a) alicyclic dicarboxylic acid used in the present embodiment, from the viewpoints of heat resistance, fluidity, toughness, low water absorbance, strength, and rigidity, an aliphatic dicarboxylic acid is preferred, and more preferred is an aliphatic dicarboxylic acid having 6 or more carbon atoms.

Of these, as the (c-1) dicarboxylic acid other than the (a) alicyclic dicarboxylic acid, from the viewpoints of heat resistance and low water absorbance or the like, an aliphatic dicarboxylic acid having 10 or more carbon atoms is preferable.

Examples of the aliphatic dicarboxylic acids having 10 or more carbon atoms include, but are not limited to, sebacic acid, dodecanedioic acid, tetradecanedioic acid, hexadecanedioic acid, octadecanedioic acid, and eicosanedioic acid.

Of these, as the (c-1) dicarboxylic acid other than the (a) alicyclic dicarboxylic acid, from the viewpoint of heat resistance or the like, sebacic acid and/or dodecanedioic acid are preferable.

From the viewpoints of heat resistance, fluidity, toughness, low water absorbance, strength, and rigidity or the like, the (c-1) dicarboxylic acid other than the (a) alicyclic dicarboxylic acid used in the present embodiment is preferably an aromatic dicarboxylic acid, and more preferably an aromatic dicarboxylic acid having 8 carbon atoms.

Of these, from the viewpoints of heat resistance, fluidity, and surface appearance or the like, isophthalic acid is preferable as the (c-1) dicarboxylic acid other than the (a) alicyclic dicarboxylic acid.

Furthermore, within a range which does not impair the purpose of the present embodiment, the (c-1) dicarboxylic acid other than the (a) alicyclic dicarboxylic acid may further contain a trivalent or higher polyvalent carboxylic acid, such as trimellitic acid, trimesic acid, and pyromellitic acid.

As the polyvalent carboxylic acid, only one kind may be used alone, or two or more kinds may be used in combination.

A ratio (mol %) of the (a) alicyclic dicarboxylic acid in the (a) alicyclic dicarboxylic acid and the (c-1) dicarboxylic acid other than the (a) alicyclic dicarboxylic acid is not particularly limited, and is preferably 50 to 100 mol %, more preferably 60 to 100 mol %, and still more preferably 70 to 100 mol %.

By setting the ratio of the (a) alicyclic dicarboxylic acid in the total amount of (a) and (c-1) to 50 to 100 mol %, a polyamide which has excellent strength, high-temperature strength, low water absorbance, low blocking properties, mold release properties, and plasticizing time stability is obtained. A polyamide composition comprising the polyamide has excellent vibration fatigue resistances and surface appearance.

<(c-2) Diamine Having Number of Carbon Atoms Equal to or Less than that of the (b) Diamine and being other than the (b) Diamine>

Examples of the (c-2) diamine having the number of carbon atoms equal to or less than that of the (b) diamine include and being other than the (b) diamine, but are not limited to, aliphatic diamines, alicyclic diamines, and aromatic diamines.

Examples of the aliphatic diamines include, but are not limited to, straight-chain aliphatic diamines, such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine, and branched aliphatic diamines, such as 2-methylpentamethylenediamine, 2,2,4-trimethylhexamethylenediamine, 2,4,4-trimethylhexamethylenediamine, 2-methyloctamethylenediamine, and 2,4-dimethyloctamethylenediamine.

Examples of the alicyclic diamines (also referred to as cycloaliphatic diamines) include, but are not limited to, 1,4-cyclohexanediamine, 1,3-cyclohexanediamine, and 1,3-cyclopentanediamine.

The aromatic diamine is a diamine containing an aromatic group. Examples of the aromatic diamines include, but are not limited to, meta-xylylenediamine, ortho-xylylenediamine, and para-xylylenediamine.

From the viewpoints of heat resistance, fluidity, toughness, low water absorbance, strength, and rigidity or the like of the polyamide according to the present embodiment, the (c-2) diamine having the number of carbon atoms equal to or less than that of the (b) diamine and being other than the (b) diamine, used in the present embodiment is preferably an aliphatic diamine and an alicyclic diamine, more preferably an aliphatic diamine having 4 to 13 carbon atoms, still more preferably an aliphatic diamine having 4 to 7 carbon atoms, and yet still more preferably 1,6-hexamethylenediamine and 2-methylpentamethylenediamine.

Furthermore, within a range which does not impair the purpose of the present embodiment, the (c-2) diamine having the number of carbon atoms equal to or less than that of the (b) diamine and being other than the (b) diamine may contain a trivalent or higher polyvalent aliphatic amine, such as bishexamethylenetriamine.

As the polyvalent aliphatic amine, one kind may be used alone, or two or more kinds may be used in combination.

A ratio (mol %) of the (b) diamine having 8 or more carbon atoms in the (b) diamine having 8 or more carbon atoms and the (c-2) diamine having the number of carbon atoms equal to or less than that of the (b) diamine and being other than the (b) diamine is not particularly limited, and is preferably 40 to 100 mol %, more preferably 50 to 100 mol %, and still more preferably 60 to 100 mol %. By setting the ratio of the (b) diamine having 8 or more carbon atoms to 40 to 100 mol % of the total amount of (b) and (c-2), a polyamide which has excellent strength, high-temperature strength, low water absorbance, low blocking properties, mold release properties, and plasticizing time stability can be obtained. A polyamide composition comprising the polyamide has excellent vibration fatigue resistances and surface appearance.

<(c-3) Lactam and/or Aminocarboxylic Acid>

The term "(c-3) lactam and/or aminocarboxylic acid" means a lactam and/or aminocarboxylic acid capable of polycondensation.

If the polyamide according to the present embodiment is a copolymer polyamide obtained by polymerizing the (a) alicyclic dicarboxylic acid, the (b) diamine having 8 or more carbon atoms, and the (c-3) lactam and/or aminocarboxylic acid, the (c-3) lactam and/or aminocarboxylic acid is preferably a lactam and/or aminocarboxylic acid having 4 to 14 carbon atoms, and more preferably a lactam and/or aminocarboxylic acid having 6 to 12 carbon atoms from the viewpoints of fluidity and toughness.

Examples of the lactams include, but are not limited to, butyrolactam, pivalolactam, ε-caprolactam, caprylolactam, enantholactam, undecanonelactam, and laurolactam (dodecanolactam).

Of these, as the lactams, from the viewpoint of toughness, ε-caprolactam, undecanonelactam, and laurolactam or the like are preferable, and ε-caprolactam, and laurolactam are more preferable.

Examples of the aminocarboxylic acid include, but are not limited to, ω-aminocarboxylic acid and α,ω-amino acid, which are compounds obtained by opening the ring of the above-described lactams.

As the aminocarboxylic acid, a straight-chain or branched saturated aliphatic carboxylic acid having 4 to 14 carbon atoms substituted at the ω position with an amino group is preferable. Examples thereof include 6-aminocaproic acid, 11-aminoundecanoic acid, and 12-aminododecanoic acid. Examples of the aminocarboxylic acid include para-aminomethylbenzoic acid.

Of these, from the viewpoints of low water absorption and toughness, the aminocarboxylic acid is more preferably 11-aminoundecanoic acid and 12-aminododecanoic acid or the like.

The amount (mol %) of the (c-3) lactam and/or aminocarboxylic acid added is not particularly limited, and is preferably 0.5 mol % or more and 20 mol % or less, and more preferably 2 mol % or more and 18 mol % or less, based on a total molar amount (100 mol %) of the respective monomers of the (a) alicyclic dicarboxylic acid, the (b) diamine having 8 or more carbon atoms, and the (c-3) lactam and/or aminocarboxylic acid. By setting the amount of the (c-3) lactam and/or aminocarboxylic acid added to 0.5 mol % or more and 20 mol % or less, a polyamide which has excellent heat resistance, low water absorbance, strength, and mold release properties or the like can be obtained.

(Content Ratios of (a) to (c) Components)

In the polyamide according to the present embodiment, the content ratio of the at least one (a) alicyclic dicarboxylic acid is preferably the same molar amount as the content ratio of the (b) diamine having 8 or more carbon atoms. Therefore, as raw materials when the polyamide according to the present embodiment is obtained, the used amount of the dicarboxylic acid is preferably about the same molar amount as the used amount of the diamine. Specifically, considering escape out of the diamine reaction system in molar ratio during the polymerization reaction, based on the total dicarboxylic acid molar amount of 1, the total diamine molar amount is preferably 0.9 to 1.2, more preferably 0.95 to 1.1, and still more preferably 0.98 to 1.05.

The content ratio of the (c) copolymer component is preferably 5.0 mol % or more and 22.5 mol % or less, more preferably 7.5 mol % or more and 20.0 mol % or less, and still more preferably 10.0 mol % or more and 18.0 mol % or less, based on 100 mol % of the total amount of all constituent components of the polyamide. By setting the content ratio of the (c) copolymer component to be within the range, a polyamide which has excellent strength, high-temperature strength, low water absorbance, low blocking properties, mold release properties, and plasticizing time stability can be obtained.

(End-Capping Agent)

In the present embodiment, apart from the (a) to (c) components, a known end-capping agent can be further added for molecular weight regulation in polymerizing the polyamide.

Examples of the end-capping agent include, but are not limited to, monocarboxylic acids, monoamines, acid anhydrides such as phthalic anhydride, monoisocyanates, monoacid halides, monoesters, and monoalcohols. From the viewpoint of thermal stability, monocarboxylic acids and monoamines are preferable.

As the end-capping agent, one kind may be used alone, or two or more kinds may be used in combination.

Examples of the monocarboxylic acids which can be used as the end-capping agent are not particularly limited, as long as the monocarboxylic acid is reactive with an amino group. Examples thereof include aliphatic monocarboxylic acids such as formic acid, acetic acid, propionic acid, butyric acid, valeric acid, caproic acid, caprylic acid, lauric acid, tridecyl acid, myristyl acid, pulmitic acid, stearic acid, pivalic acid, and isobutyric acid; alicyclic monocarboxylic acids such as cyclohexane carboxylic acid; and aromatic monocarboxylic acids such as benzoic acid, toluic acid, α-naphthalene carboxylic acid, β-naphthalene carboxylic acid, methylnaphthalene carboxylic acid, and phenylacetic acid.

As the monocarboxylic acid, one kind may be used, or two or more kinds may be used in combination.

Examples of the monoamines which can be used as the end-capping agent are not particularly limited, as long as the monoamine is reactive with a carboxyl group. Examples thereof include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

As the monoamine, one kind may be used, or two or more kinds may be used in combination.

(Properties of Polyamide)

<Trans Isomer Ratio>

In the polyamide according to the present embodiment, the alicyclic dicarboxylic acid structure exists as trans and cis geometric isomers.

The trans isomer ratio in the portion derived from the (a) alicyclic dicarboxylic acid in the polyamide according to the present embodiment represents the ratio of trans isomers based on the whole alicyclic dicarboxylic acid in the polyamide. The trans isomer ratio is preferably 50 to 85 mol %, more preferably 50 to 80 mol %, and still more preferably 65 to 80 mol %.

As the (a) alicyclic dicarboxylic acid used as a raw material, an alicyclic dicarboxylic acid having a trans isomer/cis isomer ratio (molar ratio) of 50/50 to 0/100 is preferably used as described above. On the other hand, the trans isomer ratio in the portion derived from the (a) alicyclic dicarboxylic acid in the polyamide according to the present embodiment is preferably within the range.

By setting the trans isomer ratio to be within the above-described range, in addition to the properties of a high melting point, and excellent toughness, strength, rigidity, and plasticizing time stability, the polyamide according to the present embodiment has qualities which simultaneously satisfy rigidity during heating due to a high Tg, fluidity, which is normally a quality that conflicts with heat resistance, and a high crystallinity. A polyamide composition comprising the polyamide has excellent surface appearance.

Examples of a method for controlling the trans isomer ratio in the portion derived from the (a) alicyclic dicarboxylic acid in the polyamide to the range include a polymerization method for the polyamide and a method for controlling polymerization conditions for the polyamide. If a polyamide is produced by hot melt polymerization, a melt state is preferably kept until the polymerization is completed. In order to keep a melt state, it is necessary to perform the production under polymerization conditions suitable to a polyamide composition. Specific examples thereof include a method for controlling a polymerization pressure to be a high pressure of 23 to 50 kg/cm$^2$ (gauge pressure) and preferably 25 kg/cm$^2$ (gauge pressure) or more, and lowering a pressure within a tank over 30 minutes or more to atmospheric pressure (gauge pressure of 0 kg/cm$^2$) while continuing heating.

In the present embodiment, the trans isomer ratio in the polyamide can be obtained, for example, by dissolving 30 to 40 mg of the polyamide in 1.2 g of hexafluoroisopropanol deuteride and subjecting the obtained solution to $^1$H-NMR. Specifically, for 1,4-cyclohexanedicarboxylic acid, the trans isomer ratio can be determined from a ratio of the peak surface area at 1.98 ppm derived from trans isomers and the peak surface areas at 1.77 ppm and 1.86 ppm derived from cis isomers obtained in the $^1$H-NMR measurement.

<Biomass Plastic Ratio>

The biomass plastic ratio of the polyamide according to the present embodiment is preferably 25% or more from the viewpoint of reducing the environmental load. Herein, the biomass plastic ratio means a ratio, in the polyamide, of units formed from biomass-derived raw materials. The biomass plastic ratio can be calculated by the method described in Examples below. The biomass plastic ratio is more preferably 30% or more. The upper limit of the biomass plastic ratio of the polyamide according to the present embodiment is not particularly limited and is, for example, 80% from the viewpoint of heat resistance of the polyamide.

The biomass-derived raw material herein means a monomer, out of the (a) to (c) components corresponding to the constituent components of the polyamide, which can be synthesized from a starting material of a component of a plant or the like. Examples of the biomass derived material include sebacic acid, decamethylenediamine, and 11-aminoundecanoic acid which can be synthesized from triglyceride ricinoleate, that is, a main component of castor oil, azelaic acid which can be synthesized from a component of a sunflower seed, and pentamethylenediamine and γ-aminobutyric acid which can be synthesized from cellulose.

Since the biomass is accumulated by absorbing a carbon dioxide gas contained in the atmosphere through photosynthesis, even when plastic obtained from the material is burned after use to release carbon dioxide to the atmosphere, the released carbon dioxide gas is originally present in the atmosphere. Thereby, the carbon dioxide concentration in the atmosphere is not increased.

Accordingly, it is very effective in reduction of the environmental load that the polyamide has a high biomass plastic ratio. Examples of a method for increasing the biomass plastic ratio of the polyamide to 25% or more include a method for increasing the blend ratios of the above-described biomass-derived raw materials in the production of the polyamide.

<Sulfuric Acid Relative Viscosity at 25° C.>

The molecular weight of the polyamide according to the present embodiment can use a sulfuric acid relative viscosity ηr at 25° C. as an index.

The sulfuric acid relative viscosity ηr at 25° C. of the polyamide according to the present embodiment is 2.3 or more from the viewpoints of tensile strength and high-temperature strength of the polyamide, and vibration fatigue resistances of the polyamide composition or the like. The sulfuric acid relative viscosity ηr is preferably 2.3 to 5.0, more preferably 2.4 to 4.0, and still more preferably 2.5 to 3.5.

By setting the sulfuric acid relative viscosity ηr of the polyamide to 2.3 or more, and preferably 2.3 to 5.0, a polyamide which has excellent tensile strength, high-temperature strength, and toughness can be obtained. A polyamide composition comprising a component represented by the inorganic filler below has excellent vibration fatigue resistances.

Examples of a method for controlling the sulfuric acid relative viscosity ηr at 25° C. of the polyamide to the range include a method for adding a known polycondensation catalyst such as phosphoric acid or sodium hypophosphite as additives in the hot melt polymerization of the polyamide, a method for adjusting the amount of the diamine added as an additive in the hot melt polymerization of the polyamide, a method for decreasing the amount of the end-capping agent added, and a method for controlling a polymerization condition such as a heating condition or a decompression condition to promote dehydration.

The measurement of the sulfuric acid relative viscosity ηr at 25° C. of the polyamide can be carried out in the present embodiment on the basis of JIS-K6920 as described in Examples below.

<Molecular Weight Distribution>

The molecular weight distribution of the polyamide according to the present embodiment uses Mw (weight average molecular weight)/Mn (number average molecular weight) as an index.

Mw (weight average molecular weight)/Mn (number average molecular weight) of the polyamide according to the present embodiment is 4.0 or less from the viewpoints of strength and high-temperature strength of the polyamide, and vibration fatigue resistances of the polyamide composition, or the like, preferably 1.5 to 3.5, more preferably 1.5 to 3.3, still more preferably 1.5 to 3.0, and yet still more preferably 1.5 to 2.5. The lower limit of the molecular weight distribution is 1.0.

By setting Mw (weight average molecular weight)/Mn (number average molecular weight) of the polyamide according to the present embodiment to 4.0 or less, a polyamide which has excellent polymerization yield in melt polymerization and plasticizing time stability can be obtained. A polyamide composition comprising a component represented by the inorganic filler below has excellent surface appearance.

The polyamide according to the present embodiment is greatly characterized in that the sulfuric acid relative viscosity ηr at 25° C. is 2.3 or more, and Mw/Mn is 4.0 or less, as described above.

Thereby, the ratio of polyamide molecules having a three-dimensional structure in spite of the increased molecular weight is decreased, and the formation of the three-dimensional structure of the molecules can be suppressed in high-temperature processing, which can provide excellent fluidity.

Examples of a method for controlling Mw (weight average molecular weight)/Mn (number average molecular weight) of the polyamide within the range include a method for adding a known polycondensation catalyst such as phosphoric acid or sodium hypophosphite as additives in the hot melt polymerization of the polyamide, and a method for controlling a polymerization condition such as a heating condition or a decompression condition.

In the polyamide according to the present embodiment, as described above, the sulfuric acid relative viscosity ηr at 25° C. is 2.3 or more, and Mw/Mn is 4.0 or less.

When the molecular structure of the polyamide contains an aromatic compound unit, the molecular weight distribution (Mw/Mn) tends to be increased with the increase in the molecular weight. The increased molecular weight distribution means a high ratio of the polyamide molecules having the three-dimensional structure of the molecules, and is apt to further progress the formation of the three-dimensional structure of the molecules in high-temperature processing, which deteriorates fluidity.

The polyamide according to the present embodiment contains the unit comprising the (a) alicyclic dicarboxylic acid, and the unit comprising the (b) diamine having 8 or more carbon atoms, and thereby Mw/Mn is suppressed to 4.0 or less in spite of ηr of 2.3 or more, that is, the increased molecular weight.

The content of the aromatic compound unit in the polyamide according to the present embodiment is preferably 25 mol % or less, more preferably 20 mol % or less, and still more preferably 15 mol % or less based on 100 mol % of the total amount of all constituent components of the polyamide.

In the present embodiment, Mw (weight average molecular weight)/Mn (number average molecular weight) of the polyamide can be calculated by using Mw (weight average molecular weight) and Mn (number average molecular weight) obtained using GPC (gel permeation chromatography) as described in Examples below.

<Shear Viscosity Ratio>

In the polyamide according to the present embodiment, a ratio ($\eta^*1/\eta^*100$) of a shear viscosity ($\eta^*1$) at an angular velocity of 1 rad/s to a shear viscosity ($\eta^*100$) at an angular velocity of 100 rad/s is preferably 3 or less.

The ratio is more preferably 2.5 or less, and still more preferably 2 or less.

When the ratio ($\eta^*1/\eta^*100$) is 3 or less, excellent fluidity is obtained in the polyamide according to the present embodiment.

The ratio ($\eta^*1/\eta^*100$) has a relationship with the molecular weight distribution (Mw/Mn) of the polyamide. More specifically, when Mw/Mn is 4 or less, the ratio of the three-dimensional structure is decreased; the three-dimensional conversion of the molecules in high-temperature processing can be suppressed; good fluidity can be obtained; and the ratio ($\eta^*1/\eta^*100$)≤3 can be achieved.

The shear viscosity of the polyamide at a predetermined angular velocity can be measured by the method described in Examples below.

<Peak Melting Temperature>

The peak melting temperature (melting point) $T_{pm-1}$ below of the polyamide according to the present embodiment is preferably 280° C. or more, more preferably 280° C. or more and 330° C. or less, still more preferably 300° C. or more and 330° C. or less, and yet still more preferably 310° C. or more and 325° C. or less from the viewpoint of heat resistance.

A polyamide having a peak melting temperature $T_{pm-1}$ of 330° C. or less is preferable because pyrolysis or the like of the polyamide can be more effectively suppressed during melt processing such as extrusion and molding.

Examples of a method for controlling the peak melting temperature (melting point) $T_{pm-1}$ of the polyamide within the range include a method for using the (a) to (c) components as constituent components of the polyamide, and controlling the blend ratios of the components within the ranges.

The peak melting temperature (melting point), the crystallization peak temperature, and the crystallization enthalpy of the polyamide according to the present embodiment can be measured through the differential scanning calorimetry (DSC) on the basis of JIS-K7121. Specifically, the measurement can be carried out as follows.

As a measurement apparatus, Diamond-DSC manufactured by PERKIN-ELMER Inc. can be used.

As for measurement conditions, the temperature of about 10 mg of a specimen is increased from 50° C. to 350° C. at a rate of temperature increase of 20° C./min in a nitrogen atmosphere. An endothermic peak appearing during the temperature increase is taken as a melting peak, and a peak appearing at the highest temperature is taken as a peak melting temperature $T_{pm}$.

Subsequently, the temperature is kept at 350° C. for 3 minutes and lowered from 350° C. to 50° C. at a rate of temperature decrease of 20° C./min. An exothermic peak appearing during the temperature decrease is taken as a crystallization peak; the temperature is taken as a crystallization peak temperature $T_{pc-1}$; and a crystallization peak area is taken as crystallization enthalpy.

Subsequently, after keeping the temperature at 50° C. for 3 minutes, the temperature is increased again from 50° C. to 350° C. at a rate of temperature increase of 20° C./min. An endothermic peak appearing at the highest temperature during this temperature increase is taken as a peak melting temperature $T_{pm-1}$, and an endothermic peak appearing at the lowest temperature is taken as a peak melting temperature $T_{pm-2}$.

If one endothermic peak appears herein, the endothermic peak is taken as peak melting temperatures $T_{pm-1}$ and $T_{pm-2}$ ($T_{pm-1}=T_{pm-2}$). Furthermore, after keeping the temperature at 350° C. for 3 minutes, the temperature is lowered from 350° C. to 50° C. at a rate of temperature decrease of 50° C./min. A crystallization peak temperature appearing during this temperature decrease is taken as a crystallization peak temperature $T_{pc-2}$.

In the polyamide according to the present embodiment, a difference ($T_{pm}-T_{pm-1}$) between the peak melting temperature $T_{pm}$ and the peak melting temperature $T_{pm-1}$ is preferably 30° C. or less, more preferably 0 to 20° C., and still more preferably 0 to 10° C. In the polyamide, a smaller difference ($T_{pm}-T_{pm-1}$) between the peak melting temperature $T_{pm}$ and the peak melting temperature $T_{pm-1}$ means that the portion derived from the alicyclic dicarboxylic acid in the polyamide is in a thermodynamically more stable structure. A polyamide having a difference ($T_{pm}-T_{pm-1}$) between the peak melting temperature $T_{pm}$ and the peak melting temperature $T_{pm-1}$ within the range has excellent plasticizing time stability. A polyamide composition comprising the polyamide has excellent surface appearance. Examples of a method for controlling, in the polyamide, the difference ($T_{pm}-T_{pm-1}$) between the peak melting temperature $T_{pm}$ and the peak melting temperature $T_{pm-1}$ within the range include a method for using the (a) to (c) components, controlling the blend ratios within the ranges, and controlling the trans isomer ratio derived from the (a) alicyclic dicarboxylic acid in the polyamide within a range of 65 to 80 mol %.

From the viewpoint of heat resistance, the peak melting temperature $T_{pm-2}$ of the polyamide according to the present embodiment is preferably 270° C. or more, more preferably 270 to 320° C., and still more preferably 280 to 310° C.

Examples of a method for controlling the peak melting temperature (melting point) $T_{pm-2}$ of the polyamide within the range include a method for using the (a) to (c) components, and controlling the blend ratios within the ranges.

Furthermore, in the polyamide according to the present embodiment, a difference ($T_{pm-1}-T_{pm-2}$) between the peak melting temperature $T_{pm-1}$ and the peak melting temperature $T_{pm-2}$ is preferably 30° C. or less, and more preferably 10 to 20° C. The difference ($T_{pm-1}-T_{pm-2}$) between the peak melting temperature $T_{pm-1}$ and the peak melting temperature $T_{pm-2}$ of the polyamide is preferably within the range from the viewpoints of mold release properties and low blocking properties.

Examples of a method for controlling the difference ($T_{pm-1}-T_{pm-2}$) between the peak melting temperature $T_{pm-1}$ and the peak melting temperature $T_{pm-2}$ of the polyamide within the range include a method for using the (a) to (c) components, and controlling the blend ratios within the ranges.

<Crystallization Peak Temperature>

From the viewpoints of low blocking properties and mold release properties, the crystallization peak temperature $T_{pc-1}$ of the polyamide according to the present embodiment is preferably 250° C. or more, and more preferably 260° C. or more and 300° C. or less.

The crystallization peak temperature $T_{pc-1}$ can be measured by decreasing a temperature at 20° C./min in differential scanning calorimetry based on JIS-K7121.

Examples of a method for controlling the crystallization peak temperature $T_{pc-1}$ of the polyamide within the range include a method for using the (a) to (c) components, and controlling the blend ratios within the ranges.

From the viewpoints of low blocking properties and mold release properties, the crystallization peak temperature $T_{pc-2}$ of the polyamide according to the present embodiment is preferably 240° C. or more, and more preferably 240° C. to 280° C.

The crystallization peak temperature $T_{pc-2}$ can be measured by, in differential scanning calorimetry based on JIS-K7121, measuring the crystallization peak temperature $T_{pc-1}$, performing the predetermined operation as described above, and decreasing a temperature again at 50° C./min.

Examples of a method for controlling the crystallization peak temperature $T_{pc-2}$ of the polyamide within the range include a method for using the (a) to (c) components, and controlling the blend ratios within the ranges.

Furthermore, a difference ($T_{pc-1}-T_{pc-2}$) between the crystallization peak temperature $T_{pc-1}$ and the crystallization peak temperature $T_{pc-2}$ of the polyamide according to the present embodiment is preferably 10° C. or less.

A smaller difference ($T_{pc-1}-T_{pc-2}$) between the crystallization peak temperature $T_{pc-1}$ and the crystallization peak temperature $T_{pc-2}$ of the polyamide means that a crystallization speed is high and the polyamide has a stable crystal structure. The difference ($T_{pc-1}-T_{pc-2}$) between the crystallization peak temperature $T_{pc-1}$ and the crystallization peak temperature $T_{pc-2}$ of the polyamide is preferably within the range from the viewpoints of low blocking properties and mold release properties.

Examples of a method for controlling the difference ($T_{pc-1}-T_{pc-2}$) between the crystallization peak temperature $T_{pc-1}$ and the crystallization peak temperature $T_{pc-2}$ of the polyamide within the range include a method for using the (a) to (c) components, and controlling the blend ratios within the ranges. In order to attain a stable crystal structure of the polyamide by reducing the difference ($T_{pc-1}-T_{pc-2}$), it is preferable to set the number of carbon atoms in the (a) to (c) components to an even number, and to set a ratio between the number of carbon atoms and the number of amide groups (carbon atom number/amide group number) in the polyamide to 8 or more and less than 9.

From the viewpoints of heat resistance, low blocking properties, and mold release properties, the crystallization enthalpy of the polyamide according to the present embodiment is preferably 10 J/g or more, more preferably 15 J/g or more, and still more preferably 20 J/g or more. The upper limit of the crystallization enthalpy of the polyamide according to the present embodiment is not particularly limited but is 100 J/g or less.

Examples of a method for controlling the crystallization enthalpy of the polyamide within the range include a method for setting the ratio between the number of carbon atoms and the number of amide groups (carbon atom number/amide group number) in the polyamide to 8 or more, using the (a) to (c) components, and controlling the blend ratios within the ranges.

The ratio between the number of carbon atoms and the number of amide groups (carbon atom number/amide group number) in the polyamide can be controlled by the method below.

<Glass Transition Temperature Tg>

The glass transition temperature Tg of the polyamide according to the present embodiment is preferably 90° C. or more and 170° C. or less, more preferably 90° C. or more and 140° C. or less, still more preferably 100° C. or more and 140° C. or less, and yet still more preferably 115° C. or more and 140° C. or less. By setting the glass transition temperature Tg to 90° C. or more, a polyamide which has excellent heat resistance and chemical resistance can be obtained. By setting the glass transition temperature to 170° C. or less, a molded article having good surface appearance can be obtained from the polyamide.

Examples of a method for controlling the glass transition temperature Tg of the polyamide within the range include a method for using the (a) to (c) components, and controlling the blend ratios of the components to the ranges.

In the present embodiment, the glass transition temperature Tg can be measured by the differential scanning calorimetry (DSC) on the basis of JIS-K7121. Specifically, the glass transition temperature can be measured by the method described in Examples below.

In the polyamide according to the present embodiment, a difference ($T_{pc-1}$–Tg) between the crystallization peak temperature $T_{pc-1}$ obtained in decreasing a temperature at 20° C./min in the differential scanning calorimetry and the glass transition temperature Tg is preferably 140° C. or more, more preferably 145° C. or more, and still more preferably 150° C. or more.

A larger difference ($T_{pc-1}$–Tg) between the crystallization peak temperature $T_{pc-1}$ and the glass transition temperature Tg of the polyamide means that a temperature range for crystallization is larger and that the polyamide has a stable crystal structure.

A polyamide having a difference ($T_{pc-1}$–Tg) between the crystallization peak temperature $T_{pc-1}$ and the glass transition temperature Tg of 140° C. or more has excellent low blocking properties and mold release properties. The upper limit of the difference ($T_{pc-1}$–Tg) between the crystallization peak temperature $T_{pc-1}$ and the glass transition temperature Tg is not particularly limited but is preferably 300° C. or less from the viewpoint of heat resistance.

Examples of a method for controlling the difference ($T_{pc-1}$–Tg) between the crystallization peak temperature $T_{pc-1}$ and the glass transition temperature Tg of the polyamide include a method for using the (a) to (c) components, and controlling the blend ratios of the components to the ranges. In order to attain a stable crystal structure of the polyamide by increasing the difference ($T_{pc-1}$–Tg), it is preferable to set the number of carbon atoms in the (a) to (c) components to an even number, to make a carbon chain straight, and to set the ratio between the number of carbon atoms and the number of amide groups (carbon atom number/amide group number) in the polyamide to 8 or more and less than 9.

<Polymer Terminals of Polyamide>

Polymer terminals of the polyamide according to the present embodiment are classified and defined as follows:

More specifically, the polymer terminals are 1) amino terminals, 2) carboxyl terminals, 3) terminals capped by a capping agent, and 4) other terminals.

The polymer terminal of the polyamide means a terminal portion of a polymer chain formed by polymerizing a dicarboxylic acid and a diamine through an amide bond. The polymer terminals of the polyamide include one or more of these 1) to 4) terminals.

The 1) amino terminal is a polymer terminal bonded to an amino group (—$NH_2$ group) and derives from the diamine used as the raw material.

The 2) carboxyl terminal is a polymer terminal bonded to a carboxyl group (—COOH group) and derives from the dicarboxylic acid used as the raw material.

The 3) terminal capped by a capping agent is a polymer terminal capped by the carboxylic acid or amine added in the polymerization.

The 4) other terminals are polymer terminals not classified into any of the 1) to 4) terminals. Examples of the other terminals include a terminal produced from the amino terminal through a deammoniation reaction and a terminal produced from the carboxyl terminal through a decarboxylation reaction.

A ratio of the amount of amino terminals to the total amount of amino terminals and carboxyl terminals {the amount of amino terminals/(the amount of amino terminals+the amount of carboxyl terminals)} of the polyamide according to the present embodiment is not particularly limited but is preferably 0.3 or more, more preferably 0.5 or more, and still more preferably 0.7 or more. The upper limit of the ratio of the amount of amino terminals to the total amount of amino terminals and carboxyl terminals {the amount of amino terminals/(the amount of amino terminals+the amount of carboxyl terminals)} of the polyamide according to the present embodiment is preferably less than 1.0. By setting the ratio of the amount of amino terminals to the total amount of amino terminals and carboxyl terminals of the polyamide to 0.3 or more, the strength, toughness, stability in heating, and resistance to hydrolysis of the polyamide can be improved. A polyamide composition comprising the polyamide has excellent vibration fatigue resistances.

Examples of a method for controlling the ratio of the amount of amino terminals to the total amount of amino terminals and carboxyl terminals {the amount of amino terminals/(the amount of amino terminals+the amount of carboxyl terminals)} of the polyamide include a method for controlling the amounts of a diamine and an end-capping agent added as additives in the hot melt polymerization of the polyamide and the polymerization conditions.

The amount of amino terminals bonded to polymer terminals can be measured by neutralization titration. Specifically, 3.0 g of polyamide is dissolved in 100 mL of a 90 mass % phenol aqueous solution, and the obtained solution is subjected to titration with 0.025 N hydrochloric acid, to obtain the amount of amino terminals. The end point is determined in accordance with an indicated value of a pH meter.

The amount of carboxyl terminals bonded to polymer terminals can be measured by neutralization titration.

Specifically, 4.0 g of polyamide is dissolved in 50 mL of benzyl alcohol, and the obtained solution is subjected to titration with 0.1 N NaOH, to obtain the amount of carboxyl terminals. The end point is determined in accordance with change in color of a phenolphthalein indicator.

<Carbon Atom Number/Amide Group Number>

In the polyamide according to the present embodiment, the ratio between the number of carbon atoms and the number of amide groups (carbon atom number/amide group number) is preferably 8 or more, and more preferably 8.2 or more and less than 9 from the viewpoint of low water absorbance.

The ratio between the number of carbon atoms and the number of amide groups (carbon atom number/amide group number) is an index corresponding to an amino group concentration in the polyamide.

By setting the ratio between the number of carbon atoms and the number of amide groups (carbon atom number/amide group number) within the range, a polyamide which has excellent strength, high-temperature strength, low water absorbance, low blocking properties, mold release properties, and plasticizing time stability, and a polyamide composition which has excellent vibration fatigue resistances and surface appearance can be provided.

Examples of a method for controlling the ratio between the number of carbon atoms and the number of amide groups (carbon atom number/amide group number) of the polyamide include a method for using the (a) to (c) components as components and controlling the blend ratios of the components to the ranges.

The ratio (carbon atom number/amide group number) used as the index corresponding to the amino group concentration can be obtained by calculating an average number of carbon atoms per amide group in the polyamide. Specifically, it can be obtained by the method described in Examples below.

[Production Method for Polyamide]

A production method for the polyamide according to the present embodiment is not particularly limited as long as (1) the sulfuric acid relative viscosity ηr at 25° C. is 2.3 or more; and (2) Mw/Mn is 4.0 or less. Examples of the production method include a method for producing a polyamide including the step of polymerizing the at least one (a) alicyclic dicarboxylic acid and the at least one (b) diamine having 8 or more carbon atoms.

When a polyamide according to the present embodiment is obtained, the amount of the dicarboxylic acid added is preferably about the same molar amount as the amount of the diamine added. Considering escape out of the diamine reaction system in molar ratio during the polymerization reaction, based on the total dicarboxylic acid molar amount of 1, the total diamine molar amount is preferably 0.9 to 1.2, more preferably 0.95 to 1.1, and still more preferably 0.98 to 1.05.

It is preferable that the method for producing the polyamide according to the present embodiment further includes the step of increasing the degree of polymerization of the polyamide.

Examples of a method for producing the polyamide according to the present embodiment include various methods as exemplified below:

1) a method for heating an aqueous solution or an aqueous suspension of a dicarboxylic acid and a diamine salt or a mixture thereof, and polymerizing while maintaining the melt state (hereinafter, sometimes abbreviated as "hot melt polymerization");

2) a method for increasing the degree of polymerization while maintaining a solid state at a temperature equal to or lower than the melting point of a polyamide obtained by hot melt polymerization (hereinafter, sometimes abbreviated as "hot melt polymerization/solid phase polymerization"); and 3) a method ("solution method") in which polymerization is carried out using a dicarboxylic acid halide component equivalent to the dicarboxylic acid and a diamine component.

Of these, a production method including the hot melt polymerization is preferable, and if a polyamide is produced by the hot melt polymerization, a melt state is preferably kept until the polymerization is completed. In order to keep a melt state, it is necessary to perform the production under polymerization conditions suitable to a polyamide composition. For example, a polymerization pressure used in the hot melt polymerization method is controlled to a high pressure of 23 to 50 kg/cm$^2$ (gauge pressure), and preferably 25 kg/cm$^2$ (gauge pressure) or more. While continuing heating, a pressure within a tank is lowered over 30 minutes or more to atmospheric pressure (gauge pressure of 0 kg/cm$^2$). A polyamide obtained by the production method can satisfy the properties of the conditions (1) and (2), and the trans isomer ratio or the like.

In the method for producing a polyamide according to the present embodiment, from the viewpoint of fluidity of the polyamide, it is preferable to carry out the polymerization while maintaining the trans isomer ratio of the portion derived from the (a) alicyclic dicarboxylic acid in the polyamide to be obtained at 85% or less. Particularly, when the trans isomer ratio is maintained at 80% or less, and more preferably 65 to 80%, a polyamide which has more excellent color tone, tensile elongation, and plasticizing time stability, and has a high melting point can be obtained. A polyamide composition comprising the polyamide has excellent surface appearance.

In the polyamide production method according to the present embodiment, to increase the melting point of the polyamide by increasing the degree of polymerization, it may necessary to increase the heating temperature and/or lengthen the heating time. In such a case, the coloration of the polyamide may occur due to the heating and the tensile elongation may deteriorate due to heat degradation. The rate of increase of the molecular weight may dramatically deteriorate.

In order to prevent the coloration, deterioration in tensile elongation due to heat degradation, and deterioration of plasticizing time stability of the polyamide, and in order to prevent deterioration of surface appearance of a polyamide composition comprising the polyamide, it is suitable to carry out the polymerization with the trans isomer ratio maintained at 80% or less.

As a method for producing a polyamide according to the present embodiment, a method for producing a polyamide by the 1) hot melt polymerization and the 2) hot melt polymerization/solid phase polymerization is preferable.

When the production method is used, the trans isomer ratio of the polyamide can be easily maintained at 80% or less, and the obtained polyamide has excellent color tone and plasticizing time stability. Furthermore, a polyamide composition comprising the polyamide has excellent surface appearance.

In the polyamide production method according to the present embodiment, the polymerization mode may be either a batch method or a continuous method.

The polymerization apparatus is not particularly limited. Examples of the polymerization apparatus include known apparatuses such as an autoclave type reactor, a tumbler type reactor, and an extruder type reactor such as a kneader.

The method for producing a polyamide according to the present embodiment is not particularly limited as long as a polyamide satisfying the properties of the conditions (1) and (2) or the like can be obtained. For example, a polyamide can be produced by batch hot melt polymerization as described below.

Examples of the method for producing a polyamide by the batch hot melt polymerization include the following.

In producing a polyamide by the hot melt polymerization, it is preferable to keep a melt state until the polymerization is completed. In order to keep a melt state, it is necessary to carry out the production under polymerization conditions suitable to a polyamide composition.

With water used as a solvent, an approximately 40 to 60 mass % solution containing polyamide components (the (a) to (c) components) is concentrated in a concentration tank operated at a temperature of 110 to 180° C. and a pressure of about 0.35 to 6 kg/cm$^2$ (gauge pressure) to about 65 to 90 mass % to obtain a concentrated solution. Then, this concentrated solution is transferred to an autoclave, and heating is continued until a pressure in the vessel reaches about 23 to 50 kg/cm$^2$ (gauge pressure). Subsequently, the pressure is kept at about 23 to 50 kg/cm$^2$ (gauge pressure) while extracting water and/or a gas component. In order to keep a melt state here, a pressure suitable to a polyamide composition is necessary, and particularly when a diamine having a large number of carbon atoms is used, the pressure within the vessel is preferably 25 kg/cm$^2$ (gauge pressure) or more. When the temperature within the vessel reaches about 250 to 350° C., the pressure within the vessel is lowered to atmospheric pressure (gauge pressure of 0 kg/cm$^2$). In order to keep a melt state here, it is preferable to lower the pressure over 20 minutes or more while continuing the heating. After lowering the pressure to atmospheric pressure, water produced as a byproduct can be effectively removed by reducing the pressure as necessary. Then, the pressure is increased with an inert gas such as nitrogen, and a polyamide melt product is extruded as a strand. A final temperature of a resin temperature (solution temperature) is preferably higher than the temperature $T_{pm-1}$ by 10° C. or more for keeping a melt state. The strand can be cooled and cut to obtain pellets of the polyamide.

[Polyamide Composition]

A polyamide composition according to the present embodiment contains the polyamide and one or more components selected from the group consisting of an inorganic filler, a nucleating agent, a lubricant, a stabilizer, and a polymer other than the polyamide.

(Inorganic Filler)

Examples of the inorganic filler include, but are not limited to a glass fiber, a carbon fiber, a calcium silicate fiber, a potassium titanate fiber, an aluminum borate fiber, clay, glass flakes, talc, kaolin, mica, hydrotalcite, calcium carbonate, magnesium carbonate, zinc carbonate, zinc oxide, calcium phosphate monobasic, wollastonite, silica, zeolite, alumina, boehmite, aluminum hydroxide, titanium oxide, silicon oxide, magnesium oxide, calcium silicate, sodium aluminosilicate, magnesium silicate, Ketchen black, acetylene black, furnace black, carbon nanotubes, graphite, brass, copper, silver, aluminum, nickel, iron, calcium fluoride, montmorillonite, expandable fluorine mica, and an apatite.

Of these, from the viewpoint of further improving the mechanical strength, one or more selected from the group consisting of a glass fiber, a carbon fiber, wollastonite, kaolin, mica, talc, calcium carbonate, magnesium carbonate, a potassium titanate fiber, an aluminum borate fiber, and clay are preferable. Of these, one or more selected from the group consisting of a glass fiber, a carbon fiber, wollastonite, kaolin, mica, talc, calcium carbonate, and clay are more preferable.

A number average fiber diameter of the glass fiber or carbon fiber is preferably 3 to 30 μm, more preferably 3 to 20 μm, still more preferably 3 to 12 μm, yet still more preferably 3 to 9 μm, and particularly preferably 4 to 6 μm from the viewpoint of improving toughness and surface appearance of a molded article.

By setting the number average fiber diameter of the glass fiber or carbon fiber to 30 μm or less, a polyamide composition which has excellent toughness and surface appearance of a molded article can be obtained. On the other hand, by setting the number average fiber diameter to 3 μm or more, a polyamide composition well balanced in cost and handling of a powder and physical properties (such as fluidity) can be obtained. Furthermore, by setting the number average fiber diameter to 3 to 9 μm, a polyamide composition which has excellent vibration fatigue resistances and slidability can be obtained.

A glass fiber or a carbon fiber may have a true circular shape or a flat shape in its cross-section. Examples of the flat-shaped cross-section include, but are not limited to a rectangular shape, an oblong shape close to a rectangular shape, an elliptic shape, and a cocoon shape having a constricted portion in the center along the lengthwise direction. An "ellipticity" herein means a value expressed by D2/D1 assuming that the fiber cross-section has a major axis D2 and a minor axis D1 (a true circular shape has an ellipticity of approximately 1).

Out of various glass fibers and carbon fibers, from the viewpoint that a polyamide composition can be provided with excellent mechanical strength, those having a number average fiber diameter of 3 to 30 μm, a weight average fiber length of 100 to 750 μm, and an aspect ratio (L/D) between the weight average fiber length (L) and the number average fiber diameter (D) of 10 to 100 can be preferably used.

From the viewpoints of reducing a bend of a plate-shaped molded article and improving heat resistance, toughness, low water absorbance, and thermal aging resistance, the ellipticity is preferably 1.5 or more, more preferably 1.5 to 10.0, still more preferably 2.5 to 10.0, and yet still more preferably 3.1 to 6.0. By setting the ellipticity within the range, the inorganic filler can be effectively prevented from being crushed in processing of mixing, kneading and molding or the like with other components, and preferably, desired effects for a molded article are sufficiently attained.

The thickness of a glass fiber or a carbon fiber having an ellipticity of 1.5 or more is not limited to but is preferably 0.5 to 25 μm in the minor axis D1 of the fiber cross-section and 1.25 to 250 μm in the major axis D2 of the fiber cross-section. When the axes are within these ranges, difficulty in spinning of a fiber can be effectively avoided, and the strength of a molded article can be improved without decreasing a contact area with a resin (polyamide). The minor axis D1 is more preferably 3 to 25 μm, and still more preferably, the minor axis D1 is 3 to 25 μm and the ellipticity is larger than 3.

The glass fiber or the carbon fiber having an ellipticity of 1.5 or more can be produced by methods, for example, described in Japanese Patent Publication No. 3-59019, Japanese Patent Publication No. 4-13300, and Japanese Patent Publication No. 4-32775 or the like. Particularly, a glass fiber having an ellipticity of 1.5 or more is preferably produced by using either an orifice plate having a large number of orifices on a bottom thereof and a convex edge surrounding a plurality of outlets of the orifices and extending downward from the bottom, or a nozzle tip for spinning modified cross-section glass fiber having a single or a plurality of orifice holes and a plurality of convex edges extending downward from the end of a circumferential portion thereof. The fibrous reinforcing material may be directly used with a fiber strand used as a roving, or may be used as chopped glass strands after performing a cutting step.

The number average fiber diameter and the weight average fiber length herein are values obtained by the following method. A polyamide composition is put in an electric furnace for thermal disposal of an organic substance contained therein. From a residue of the thermal disposal, 100 or more glass fibers (or carbon fibers) are arbitrarily selected to be observed with a scanning electron microscope (SEM). Fiber diameters of these glass fibers (or carbon fibers) are measured, to obtain a number average fiber diameter. In addition, fiber lengths are measured by using SEM micrographs of the 100 or more glass fibers (or carbon fibers) obtained at 1,000 times magnification, to obtain a weight average fiber length.

The glass fiber or carbon fiber may be subjected to a surface treatment with a silane coupling agent or the like. Examples of the silane coupling agent include, but are not limited to, aminosilanes such as γ-aminopropyltriethoxysilane, γ-aminopropyltrimethoxysilane, and N-β-(aminoethyl)-γ-aminopropylmethyldimethoxysilane, mercaptosilanes such as γ-mercaptopropyltrimethoxysilane and γ-mercaptopropyltriethoxysilane, epoxysilanes, and vinylsilanes. Of these, one or more selected from the group consisting of the components cited above are preferably used, and aminosilanes are more preferably used.

The glass fiber or carbon fiber may include, as a sizing agent, a copolymer which includes, as constituent units, a carboxylic acid anhydride-containing unsaturated vinyl monomer and an unsaturated vinyl monomer excluding the carboxylic acid anhydride-containing unsaturated vinyl monomer; an epoxy compound; a polyurethane resin; a homopolymer of acrylic acid; a copolymer of acrylic acid and other copolymerizable monomer; salts of these with primary, secondary or tertiary amine; and a copolymer which includes a carboxylic acid anhydride-containing unsaturated vinyl monomer and an unsaturated vinyl monomer excluding the carboxylic acid anhydride-containing unsaturated vinyl monomer. Only one kind of these sizing agents may be used alone, or two or more kinds of them may be used in combination.

Of these, from the viewpoint of mechanical strength of a polyamide composition to be obtained, a copolymer which includes, as constituent units, a carboxylic acid anhydride-containing unsaturated vinyl monomer and an unsaturated vinyl monomer excluding the carboxylic acid anhydride-containing unsaturated vinyl monomer, an epoxy compound, a polyurethane resin, and a combination of them are preferably used as the sizing agent. More preferably, a copolymer which includes, as constituent units, a carboxylic acid anhydride-containing unsaturated vinyl monomer and an unsaturated vinyl monomer excluding the carboxylic acid anhydride-containing unsaturated vinyl monomer, a polyurethane resin, and a combination of them are used.

The glass fiber or carbon fiber is obtained through a continuous reaction caused by drying a fiber strand produced with any of the sizing agents added to the fiber by a known method using a roller type applicator or the like in a known production step for the fiber.

The fiber strand may be directly used as the roving, or may be further cut to be used as chopped glass strands.

The sizing agent is applied (added) in an amount, in terms of a solid content ratio, corresponding to preferably 0.2 to 3 mass %, and more preferably 0.3 to 2 mass % based on 100 mass % of the glass fiber or carbon fiber. More specifically, from the viewpoint of maintaining bundling of the fiber, the amount of the sizing agent added is preferably 0.2 mass % or more in terms of a solid content ratio based on 100 mass % of the glass fiber or carbon fiber. On the other hand, from the viewpoint of improving thermal stability of a polyamide composition to be obtained, the amount of the sizing agent added is preferably 3 mass % or less. The strand may be dried after cutting, or the strand may be cut after drying.

An inorganic filler other than the glass fiber and carbon fiber is not limited to but is preferably wollastonite, kaolin, mica, talc, calcium carbonate, magnesium carbonate, a potassium titanate fiber, an aluminum borate fiber, and clay from the viewpoint of improving the strength, rigidity, and surface appearance of a molded article. The inorganic filler is more preferably wollastonite, kaolin, mica, talc, calcium carbonate, and clay, still more preferably wollastonite, kaolin, mica, and talc, yet still more preferably wollastonite and mica, and particularly preferably, wollastonite. One kind of these inorganic fillers may be used alone, or two or more kinds of them may be used in combination.

An average particle size of the inorganic filler other than the glass fiber or carbon fiber is preferably 0.01 to 38 μm, more preferably 0.03 to 30 μm, still more preferably 0.05 to 25 μm, yet still more preferably 0.10 to 20 μm, and particularly preferably 0.15 to 15 μm from the viewpoint of improving toughness, and surface appearance of a molded article.

By setting the average particle size of the inorganic filler other than the glass fiber or carbon fiber to 38 μm or less, a polyamide composition which has excellent toughness, and surface appearance of a molded article can be obtained. On the other hand, by setting the average particle size to 0.1 μm or more, a polyamide composition well balanced in cost and handling of a powder and physical properties (such as fluidity) can be obtained.

Herein, as for the inorganic fillers having a needle shape as wollastonite, a number average fiber diameter (hereinafter, referred to simply as the "average fiber diameter") is taken as the average particle size. If the cross-section is not a circle, the maximum value of the length is taken as the (number average) fiber diameter.

A weight average fiber length (hereinafter, referred to simply as the "average fiber length") of those having the needle shape is preferably in a range of numerical values calculated from the above-described preferable range of the number average fiber diameter and a preferable range of an aspect ratio (L/D) between a weight average fiber length (L) and a number average fiber diameter (D) described below.

The aspect ratio (L/D) between a weight average fiber length (L) and a number average fiber diameter (D) of those having a needle shape is preferably 1.5 to 10, more preferably 2.0 to 5, and still more preferably 2.5 to 4 from the viewpoints of improving surface appearance of a molded article and preventing abrasion of metal parts of an injection molding machine or the like.

The inorganic filler other than the glass fiber or carbon fiber may be subjected to a surface treatment with a silane coupling agent and a titanate-based coupling agent or the like. Examples of the silane coupling agent include, but are not limited to, aminosilanes such as γ-aminopropyltriethoxysilane, γ-aminopropyltrimethoxysilane, and N-β-(aminoethyl)-γ-aminopropylmethyldimethoxysilane, mercaptosilanes such as γ-mercaptopropyltrimethoxysilane and γ-mercaptopropyltriethoxysilane, epoxysilanes, and vinylsilanes. Of these, one or more selected from the components cited above are preferably used, and aminosilanes are more preferably used. The surface treatment agent may be preliminarily used for treating the surface of the inorganic filler, or may be added in mixing the polyamide and the inorganic filler. The added amount of the surface treatment agent is preferably 0.05 to 1.5 mass % based on 100 mass % of the inorganic filler.

The content of the inorganic filler is preferably 1 to 200 parts by mass, more preferably 2 to 150 parts by mass, still more preferably 5 to 120 parts by mass, and particularly preferably 10 to 80 parts by mass based on 100 parts by mass of the polyamide.

By setting the content of the inorganic filler to 1 part by mass or more based on 100 parts by mass of the polyamide, an effect to improve the strength and rigidity of a polyamide composition to be obtained can be exhibited. On the other hand, by setting the content of the inorganic filler to 200 parts by mass or less based on 100 parts by mass of the polyamide, a polyamide composition which has excellent extrudability and moldability can be obtained.

(Nucleating Agent)

The nucleating agent means a substance which shows, when added, effects to increase the crystallization peak temperature of a polyamide composition, to decrease a difference between the extrapolated onset temperature and the extrapolated end temperature of the crystallization peak, or to refine or equalize the size of spherulites of a molded article to be obtained.

Examples of the nucleating agent include, but are not limited to, talc, boron nitride, mica, kaolin, calcium carbonate, barium sulfate, silicon nitride, carbon black, potassium titanate, and molybdenum disulfide.

Only one kind of the nucleating agents may be used alone, or two or more kinds of them may be used in combination.

From the viewpoint of nucleating agent effects, the nucleating agent is preferably talc or boron nitride.

The nucleating agent preferably has a number average particle size of 0.01 to 10 μm because the nucleating agent has high nucleating agent effects.

The number average particle size of the nucleating agent can be measured as follows: A molded article is dissolved in a polyamide-soluble solvent such as formic acid, and from the obtained insoluble components, for example, 100 or more particles of the nucleating agent are arbitrarily selected and observed with an optical microscope or a scanning electron microscope or the like, to obtain the number average particle size.

In the polyamide composition according to the present embodiment, the content of the nucleating agent is preferably 0.001 to 1 part by mass, more preferably 0.001 to 0.5 part by mass, and still more preferably 0.001 to 0.09 part by mass based on 100 parts by mass of the polyamide according to the present embodiment.

By setting the content of the nucleating agent to 0.001 part by mass or more based on 100 parts by mass of the polyamide, the heat resistance of the polyamide composition is improved, and by setting the content of the nucleating agent to 1 part by mass or less based on 100 parts by mass of the polyamide, a polyamide composition which has excellent toughness can be obtained.

(Lubricant)

Examples of the lubricant include, but are not limited to, higher fatty acids, higher fatty acid metal salts, higher fatty acid esters, and higher fatty acid amides.

One kind of the lubricants may be used alone, or two or more kinds of them may be used in combination.

Examples of the higher fatty acids include saturated or unsaturated straight or branched aliphatic monocarboxylic acids having 8 to 40 carbon atoms, such as stearic acid, palmitic acid, behenic acid, erucic acid, oleic acid, lauric acid, and montanoic acid. Preferably, stearic acid and montanoic acid or the like are used.

One kind of the higher fatty acids may be used, or two or more kinds of them may be used in combination.

The higher fatty acid metal salts refer to metal salts of the above-described higher fatty acids.

As a metal element constituting a higher fatty acid metal salt, group 1, 2 and 3 elements of the periodic table, zinc, and aluminum are preferably used, and group 1 and 2 elements such as calcium, sodium, potassium, and magnesium, and aluminum or the like are more preferably used.

Examples of the higher fatty acid metal salts include but are not limited to, calcium stearate, aluminum stearate, zinc stearate, magnesium stearate, calcium montanate, sodium montanate, and calcium palmitate. Preferably, metal salts of montanoic acid and metal salts of stearic acid, or the like are used.

One kind of the higher fatty acid metal salts may be used alone, or two or more kinds of them may be used in combination.

The higher fatty acid esters refer to ester compounds of the higher fatty acids and alcohol. Esters of aliphatic carboxylic acids having 8 to 40 carbon atoms and aliphatic alcohols having 8 to 40 carbon atoms are preferably used.

Examples of the aliphatic alcohol include, but are not limited to, stearyl alcohol, behenyl alcohol, and lauryl alcohol.

Examples of the higher fatty acid esters include, but are not limited to, stearyl stearate and behenyl behenate.

One kind of such higher fatty acid esters may be used alone, or two or more kinds of them may be used in combination.

The higher fatty acid amides refer to amide compounds of the above-described higher fatty acids.

Examples of the higher fatty acid amides include, but are not limited to, stearamide, oleamide, erucic amide, ethylene bisstearyl amide, ethylene bisoleyl amide, N-stearyl stearyl amide, and N-stearyl erucic amide.

As the higher fatty acid amide, stearamide, erucic amide, ethylene bisstearyl amide, and N-stearyl erucic amide are preferably used, and ethylene bisstearyl amide and N-stearyl erucic amide are more preferably used.

Only one kind of the higher fatty acid amides may be used alone, or two or more kinds of them may be used in combination.

From the viewpoint of an effect to improve moldability, the lubricant is preferably a higher fatty acid metal salt or a higher fatty acid amide, and more preferably a higher fatty acid metal salt.

The content of the lubricant in the polyamide composition according to the present embodiment is preferably 0.001 to 1 part by mass, and more preferably 0.03 to 0.5 part by mass based on 100 parts by mass of the polyamide.

By setting the content of the lubricant within the range, a polyamide composition which has excellent mold release properties, plasticizing time stability, and toughness can be obtained, and in addition, excessive molecular weight lowering of the polyamide caused by breakage of molecular chains can be prevented.

(Stabilizer)

Examples of the stabilizer include, but are not limited to, phenol-based thermal stabilizers, phosphorous-based thermal stabilizers, amine-based thermal stabilizers, and metal salts of group 3, 4 and 11 to 14 elements of the periodic table, and halides of alkali metals and alkali earth metals.

Examples of the phenol-based thermal stabilizers include, but are not limited to, hindered phenol compounds. The hindered phenol compounds have the property of providing excellent heat resistance and light resistance to a resin such as polyamide or fiber.

Examples of the hindered phenol compounds include, but are not limited to, N,N'-hexane-1,6-diylbis[3-(3,5-di-t-butyl-4-hydroxyphenylpropionamide), pentaerythrityl-tetrakis[3-(3,5-di-t-butyl-4-hydroxyphenyl)propionate], N,N'-hexamethylenebis(3,5-di-t-butyl-4-hydroxy-hydrocinnamamide), triethylene glycol-bis[3-(3-t-butyl-5-methyl-4-hydroxyphenyl)propionate], 3,9-bis{2-[3-(3-t-butyl-4-hydroxy-5-methylphenyl)propynyloxy]-1,1-dimethylethyl}-2,4,8,10-tetraoxaspiro[5,5]undecane, 3,5-di-t-butyl-4-hydroxybenzylphosphonate-diethyl ester, 1,3,5-trimethyl-2,4,6-tris(3,5-di-t-butyl-4-hydroxybenzyl)benzene, and 1,3,5-tris(4-t-butyl-3-hydroxy-2,6-dimethylbenzyl)isocyanurate.

Only one kind of these hindered phenol compounds may be used alone, or two or more kinds of them may be used in combination.

Particularly, from the viewpoint of improving the thermal aging resistance, N,N'hexane-1,6-diylbis[3-(3,5-di-t-butyl-4-hydroxyphenylpropionamide)] is preferably used.

If a phenol-based thermal stabilizer is used, the content of the phenol-based thermal stabilizer in the polyamide composition is preferably 0.01 to 1 part by mass, and more preferably 0.1 to 1 part by mass based on 100 parts by mass of the polyamide composition. If the content of the phenol-based thermal stabilizer is within the range, the thermal aging resistance of the polyamide composition can be further improved and the amount of generated gas can be reduced.

Examples of the phosphorous-based thermal stabilizers include, but are not limited to, pentaerythritol type phosphite compounds, trioctyl phosphite, trilauryl phosphite, tridecyl phosphite, octyl diphenyl phosphite, trisisodecyl phosphite, phenyl diisodecyl phosphite, phenyl di(tridecyl) phosphite, diphenyl isooctyl phosphite, diphenyl isodecyl phosphite, diphenyl (tridecyl) phosphite, triphenyl phosphite, tris(nonylphenyl) phosphite, tris(2,4-di-t-butylphenyl) phosphite, tris(2,4-di-t-butyl-5-methylphenyl) phosphite, tris(butoxyethyl) phosphite, 4,4'-butylidene-bis(3-methyl-6-t-butylphenyl-tetra-tridecyl) diphosphite, tetra(C12 to C15 mixed alkyl)-4,4'-isopropylidenediphenyl diphosphite, 4,4'-isopropylidenebis(2-t-butylphenyl)-di(nonylphenyl) phosphite, tris (biphenyl) phosphite, tetra(tridecyl)-1,1,3-tris(2-methyl-5-t-butyl-4-hydroxyphenyl)butane diphosphite, tetra(tridecyl)-4,4'-butylidenebis(3-methyl-6-t-butylphenyl) diphosphite, tetra(C1 to 015 mixed alkyl)-4,4'-isopropylidenediphenyl diphosphite, tris(mono-di mixed nonylphenyl)phosphite, 4,4'-isopropylidenebis(2-t-butylphenyl)-di(nonylphenyl) phosphite, 9,10-di-hydro-9-oxa-9-oxa-10-phosphaphenanthrene-10-oxide, tris(3,5-di-t-butyl-4-hydroxyphenyl) phosphite, hydrogenated-4,4'-isopropylidenediphenyl polyphosphite, bis(octylphenyl)-bis(4,4'-butylidenebis(3-methyl-6-t-butylphenyl))-1,6-hexanol diphosphite, hexatridecyl-1,1,3-tris(2-methyl-4-hydroxy-5-t-butylphenyl) diphosphite, tris (4,4'-isopropylidenebis(2-t-butylphenyl)) phosphite, tris(1,3-stearoyloxyisopropyl) phosphite, 2,2-methylenebis(4,6-di-t-butylphenyl)octyl phosphite, 2,2-methylenebis(3-methyl-4,6-di-t-butylphenyl)2-ethylhexyl phosphite, tetrakis(2,4-di-t-butyl-5-methylphenyl)-4,4'-biphenylene diphosphite, and tetrakis(2,4-di-t-butylphenyl)-4,4'-biphenylene diphosphite.

Only one kind of these phosphorous-based thermal stabilizers may be used alone, or two or more kinds of them may be used in combination.

Of those cited above, from the viewpoints of further improving the thermal aging resistance of the polyamide composition and reducing the amount of generated gas, pentaerythritol type phosphite compounds and/or tris(2,4-di-t-butylphenyl)phosphite is preferably used. Examples of the pentaerythritol type phosphite compounds include, but not limited to, 2,6-di-t-butyl-4-methylphenyl-phenyl-pentaerythritol diphosphite, 2,6-di-t-butyl-4-methylphenyl-methyl-pentaerythritol diphosphite, 2,6-di-t-butyl-4-methylphenyl-2-ethylhexyl-pentaerythritol diphosphite, 2,6-di-t-butyl-4-methylphenyl-isodecyl-pentaerythritol diphosphite, 2,6-di-t-butyl-4-methylphenyl-lauryl-pentaerythritol diphosphite, 2,6-di-t-butyl-4-methylphenyl-isotridecyl-pentaerythritol diphosphite, 2,6-di-t-butyl-4-methylphenyl-stearylpentaerythritol diphosphite, 2,6-di-t-butyl-4-methylphenylcyclohexyl-pentaerythritol diphosphite, 2,6-di-t-butyl-4-methylphenyl-benzyl-pentaerythritol diphosphite, 2,6-di-t-butyl-4-methylphenylethylcellosolve-pentaerythritol diphosphite, 2,6-di-t-butyl-4-methylphenyl-butylcarbitol-pentaerythritol diphosphite, 2,6-di-t-butyl-4-methylphenyl-octylphenyl-pentaerythritol diphosphite, 2,6-di-t-butyl-4-methylphenyl-nonylphenylpentaerythritol diphosphite, bis(2,6-di-t-butyl-4-methylphenyl)pentaerythritol diphosphite, bis(2,6-di-t-butyl-4-ethylphenyl)pentaerythritol diphosphite, 2,6-di-t-butyl-4-methylphenyl-2,6-di-t-butylphenyl-pentaerythritol diphosphite, 2,6-di-t-butyl-4-methylphenyl-2,4-di-t-butylphenyl-pentaerythritol diphosphite, 2,6-di-t-butyl-4-methylphenyl-2,4-di-t-octylphenyl-pentaerythritol diphosphite, 2,6-di-t-butyl-4-methylphenyl-2-cyclohexylphenyl-pentaerythritol diphosphite, 2,6-di-t-amyl-4-methylphenyl-phenylpentaerythritol diphosphite, bis(2,6-di-t-amyl-4-methylphenyl)pentaerythritol diphosphite, and bis(2,6-di-t-octyl-4-methylphenyl)pentaerythritol diphosphite.

Only one kind of these pentaerythritol type phosphite compound may be used alone, or two or more kinds of them may be used in combination.

Of the pentaerythritol type phosphite compounds listed above, from the viewpoint of reducing the amount of generated gas of the polyamide composition, one or more of the compounds selected from the group consisting of bis(2,6-di-t-butyl-4-methylphenyl)pentaerythritol diphosphite, bis(2,6-di-t-butyl-4-ethylphenyl)pentaerythritol diphosphite, bis(2,6-di-t-amyl-4-methylphenyl)pentaerythritol diphosphite, and bis(2,6-di-t-octyl-4-methylphenyl)pentaerythritol diphosphite are preferable. Bis(2,6-di-t-butyl-4-methylphenyl)pentaerythritol diphosphite is more preferable.

If a phosphorus-based thermal stabilizer is used, the content of the phosphorus-based thermal stabilizer in the polyamide composition is preferably 0.01 to 1 part by mass, and more preferably 0.1 to 1 part by mass based on 100 parts by mass of the polyamide composition. If the content of the phosphorus-based thermal stabilizer is within the range, the thermal aging resistance of the polyamide composition can be further improved, and the amount of generated gas can be reduced.

Examples of the amine-based thermal stabilizer may include, but are not limited to, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperidine, 4-(cyclohexylcarbamoyloxy)-2,2,6,6-tetramethylpiperidine, 4-(phenylcarbamoyloxy)-2,2,6,6-tetramethylpiperidine, bis(2,2,6,6-tetramethyl-4-piperidyl)-carbonate, bis(2,2,6,6-tetramethyl-4-piperidyl)-oxalate, bis(2,2,6,6-tetramethyl-4-piperidyl)-malonate, bis(2,2,6,6-tetramethyl-4-piperidyl)-sebacate, bis(2,2,6,6-tetramethyl-4-piperidyl)-adipate, bis(2,2,6,6-tetramethyl-4-piperidyl)-terephthalate, 1,2-bis(2,2,6,6-tetramethyl-4-piperidyloxy)-ethane, α,α'-bis(2,2,6,6-tetramethyl-4-piperidyloxy)-p-xylene, bis(2,2,6,6-tetramethyl-4-piperidyltolylene-2,4-dicarbamate, bis(2,2,6,6-tetramethyl-4-piperidyl)-hexamethylene-1,6-dicarbamate, tris(2,2,6,6-tetramethyl-4-piperidyl)-benzene-1,3,5-tricarboxylate, tris(2,2,6,6-tetramethyl-4-piperidyl)-benzene-1,3,4-tricarboxylate, 1-[2-{3-(3,5-di-t-butyl-4-hydroxyphenyl)propionyloxy}butyl]-4-[3-(3,5-di-t-butyl-4-hydroxyphenyl)propionyloxy]2,2,6,6-tetramethylpiperidine, and a condensation product of 1,2,3,4-butanetetracarboxylic acid, 1,2,2,6,6-pentamethyl-4-piperidinol, and β,β,β',β'-tetramethyl-3,9-[2,4,8,10-tetraoxaspiro(5,5)undecane]diethanol. Only one kind of these amine-based thermal stabilizers may be used alone, or two or more kinds of them may be used in combination.

If the amine-based thermal stabilizer is used, the content of the amine-based thermal stabilizer in the polyamide composition is preferably 0.01 to 1 part by mass, and more preferably 0.1 to 1 part by mass based on 100 parts by mass of the polyamide composition. If the content of the amine-based thermal stabilizer is within the range, the thermal aging resistance of the polyamide composition can be further improved, and the amount of generated gas can be reduced.

The metal salts of group 3, 4 and 11 to 14 elements of the periodic table are not particularly limited as long as they are salts of metals belonging to these groups. From the viewpoint of further improving the thermal aging resistance of the polyamide composition, a copper salt is preferably used. Examples of the copper salt include, but are not limited to, copper halides (such as copper iodide, copper(I) bromide, copper(II) bromide, and copper(I) chloride), copper acetate, copper propionate, copper benzoate, copper adipate, copper terephthalate, copper isophthalate, copper salicylate, copper nicotinate, copper stearate, and copper complex salts in which copper is coordinated in a chelating agent such as ethylenediamine or ethylenediaminetetraacetic acid. One kind of these may be used alone, or two or more kinds of them may be used in combination.

Of the copper salts cited above, one or more selected from the group consisting of copper iodide, copper(I) bromide, copper(II) bromide, copper(I) chloride, and copper acetate are preferably used, and copper iodide and/or copper acetate is more preferably used. If any of the more preferable copper salts is used, a polyamide composition which has excellent thermal aging resistance and can effectively suppress metallic corrosion of a screw or a cylinder caused in extrusion (hereinafter, sometimes referred to simply as "metallic corrosion") can be obtained.

If a copper salt is used, the content of the copper salt in the polyamide composition is preferably 0.01 to 0.60 part by mass, and more preferably 0.02 to 0.40 part by mass based on 100 parts by mass of the polyamide. If the content of the copper salt is within the range, the thermal aging resistance of the polyamide composition can be further improved, and in addition, precipitation of copper and the metallic corrosion can be effectively suppressed.

The content concentration of a copper element derived from the copper salt is preferably 10 to 2000 parts by mass, more preferably 30 to 1500 parts by mass, and still more preferably 50 to 500 parts by mass based on $10^6$ parts by mass of the polyamide from the viewpoint of improving the thermal aging resistance of the polyamide composition.

Examples of the halides of alkali metals and alkali earth metals include, but are not limited to, potassium iodide, potassium bromide, potassium chloride, sodium iodide, sodium chloride, and mixtures of any of these. Of these, from the viewpoints of improving the thermal aging resistance and suppressing the metallic corrosion, potassium iodide and/or potassium bromide is preferably used, and potassium iodide is more preferably used.

If a halide of an alkali metal or alkali earth metal is used, the content of the halide of an alkali metal or alkali earth metal in the polyamide composition is preferably 0.05 to 20 parts by mass, and more preferably 0.2 to 10 parts by mass based on 100 parts by mass of the polyamide. If the content of the halide of the alkali metal or alkali earth metal is within the range, the thermal aging resistance of the polyamide composition can be further improved, and in addition, the precipitation of copper and the metallic corrosion can be effectively suppressed.

As for the components of the thermal stabilizers described above, only one kind of them may be used alone, or two or more kinds of them may be used in combination. Of these, from the viewpoint of further improving the thermal aging resistance of the polyamide composition, a mixture of a copper salt and a halide of an alkali metal or an alkali earth metal is preferably used.

A ratio between the copper salt and the halide of an alkali metal or an alkali earth metal is, in terms of a molar ratio between halogen and copper (halogen/copper), preferably 2/1 to 40/1, and more preferably 5/1 to 30/1. If the ratio is within the range, the thermal aging resistance of the polyamide composition can be further improved.

The halogen/copper ratio is preferably 2/1 or more because the precipitation of copper and the metallic corrosion can be effectively suppressed in this case. On the other hand, the halogen/copper ratio is preferably 40/1 or less because the corrosion of a screw or the like of a molding machine can be prevented substantially without deteriorating mechanical properties (such as toughness) in this case.

(Polymer Other than Polyamide)

Examples of the polymer other than the polyamide include, but are not limited to, a polyamide other than the polyamide according to the present embodiment, polyester, liquid crystal polyester, polyphenylene sulfide, polyphenylene ether, polycarbonate, polyalylate, a phenol resin, and an epoxy resin.

Examples of the polyamide other than the polyamide according to the present embodiment include, but are not limited to, polyamide 66, polyamide 56, polyamide 46, polyamide 610, polyamide 612, polyamide 6T, polyamide 61, polyamide 6, polyamide 11, polyamide 12, and polyamide MXD6, and homopolymers and copolymers of these.

Examples of the polyester include, but are not limited to, polybutylene terephthalate, polytrimethylene terephthalate, polyethylene terephthalate, and polyethylene naphthalate.

The content of the polymer other than the polyamide according to the present embodiment is preferably 1 to 200 parts by mass, more preferably 5 to 100 parts by mass, and still more preferably 5 to 50 parts by mass based on 100 parts by mass of the polyamide. By setting the content of the polymer other than the polyamide in the polyamide composition according to the present embodiment within the range, a polyamide composition which has excellent heat resistance and mold release properties can be obtained.

Within a range which does not impair the purpose of the present embodiment, the polyamide composition according to the present embodiment may contain additives which are customarily used in polyamides, such as a coloring agent like a pigment or a dye (including a coloring masterbatch), a fire retardant, a fibrillating agent, a fluorescent bleaching agent, a plasticizer, an antioxidant, an ultraviolet absorber, an antistatic agent, a fluidity improving agent, a spreading agent, and an elastomer.

If the polyamide composition according to the present embodiment contains the other raw materials which can be contained in the polyamide composition described above, the contents of the other raw materials depend upon the types of the raw materials and use application of the polyamide composition, or the like. Thereby, the contents are not particularly limited as long as the purpose of the present embodiment is not impaired.

[Method for Producing Polyamide Composition]

A method for producing the polyamide composition according to the present embodiment is not particularly limited as long as it is a production method including a step of performing melt kneading of raw material components containing the above-described polyamide. For example, a method including a step of performing melt kneading of raw material components containing the polyamide with an extruder whose set temperature is set to the peak melting temperature $T_{pm-1}$ of the polyamide +30° C. or less is preferably used.

Examples of a method for performing the melt kneading of the raw material components containing the polyamide include a method in which the polyamide and the other raw materials are mixed by using a tumbler or a Henschel mixer or the like and the resultant mixture is fed to a melt kneader for kneading, and a method in which the polyamide turned into a melt state by using a single-screw or twin-screw extruder is blended with the other raw materials fed from a side feeder.

The method for feeding the components constituting the polyamide composition to the melt kneader may be carried out by feeding all of the constituent components at once to the same feed opening, or by feeding the respective constituent components from different feed openings.

The melt kneading temperature is preferably about 250 to 375° C. at a resin temperature.

The melt kneading time is preferably about 0.25 to 5 minutes.

The apparatus for performing the melt kneading is not particularly limited. Known apparatuses, for example, melt kneaders such as a single-screw or twin-screw extruder, a Banbury mixer, and a mixing roll may be used.

[Molded Article]

A molded article according to the present embodiment contains the above-described polyamide or the above-described polyamide composition.

The molded article according to the present embodiment can be obtained by molding the polyamide or the polyamide composition by known molding methods, generally known plastic molding methods such as press molding, injection molding, gas-assisted injection molding, welding molding, extrusion molding, blow molding, film molding, hollow molding, multilayer molding, and melt spinning.

The molded article according to the present embodiment is obtained from the polyamide or the polyamide composition, and therefore, has excellent heat resistance, moldability, mechanical strength, low water absorbance, vibration fatigue resistances, and surface appearance. Accordingly, the molded article according to the present embodiment can be suitably used as various sliding parts, an automobile part, an electric or electronic part, a household appliance part, an OA equipment part, a mobile equipment part, an industrial equipment part, and various parts of daily and household articles, as well as extrusion applications. Of these, the molded article according to the present embodiment is preferably used as an automobile part, an electronic part, a household appliance part, an OA equipment part, and a mobile equipment part.

Examples of the automobile part include, but are not particularly limited to, an air intake system part, a cooling system part, a fuel system part, an interior part, an exterior part, and an electrical part.

Examples of the automobile air intake system part include, but are not particularly limited to, an air intake manifold, an intercooler inlet, an exhaust pipe cover, an inner bushing, a bearing retainer, an engine mount, an engine head cover, a resonator, and a throttle body.

Examples of the automobile cooling system part include, but are not particularly limited to, a chain cover, a thermostat housing, an outlet pipe, a radiator tank, an alternator, and a delivery pipe.

Examples of the automobile fuel system part include, but are not particularly limited to, a fuel delivery pipe and a gasoline tank case.

Examples of the automobile interior system part include, but are not particularly limited to, an instrument panel, a console box, a glove box, a steering wheel, and a trimming.

Examples of the automobile external component include, but are not particularly limited to, a molding, a lamp housing, a front grill, a mud guard, a side bumper, a door mirror stay, and a roof rail.

Examples of the automobile electrical part include, but are not particularly limited to, a connector, a wire harness connector, a motor part, a lamp socket, an on-board sensor switch, and a combination switch.

Examples of the electric or electronic part include, but are not particularly limited to, a connector, a reflector for a light emitting device, a switch, a relay, a printed wiring board, an electronic part housing, a power point, a noise filter, a coil bobbin, and a motor end cap. The reflector for a light emitting device can be widely used for a semiconductor package including an optical semiconductor such as a laser diode (LD), a photodiode, a charge coupled device (CCD), and a complementary metal oxide semiconductor (CMOS), or the like, in addition to a light emitting diode (LED).

Examples of the mobile equipment part include, but are not particularly limited to, housings and structures of mobile phones, smartphones, personal computers, portable video game players, and digital cameras or the like.

Examples of the industrial equipment part include, but are not particularly limited to, a gear, a cam, an insulation block, a valve, a power tool part, an agricultural implement part, and an engine cover.

Examples of the daily and household articles include, but are not particularly limited to, a button, a food container, and office furniture.

Examples of the extrusion applications include, but are not particularly limited to, a film, a sheet, a filament, a tube, a rod, and a hollow molded article.

Of these various applications, the molded article obtained from the polyamide composition according to the present embodiment is particularly preferably used as a part which has a thin portion (with a thickness of, for example, 0.5 mm) and is subjected to a heat treatment (for example, an electric/electronic part such as an SMT connector, a reflector for a light emitting device or a switch).

The molded article obtained from the polyamide composition according to the present embodiment has excellent surface appearance. Thereby, the molded article is preferably used as a molded article having a paint film formed on the surface thereof. The method for forming the paint film is not particularly limited as long as it is a known method, and for example, a spray method, an electrostatic coating method or the like may be used. A paint used in painting is not particularly limited as long as it is a known paint, and a melamine crosslinking type polyester polyol resin paint and an acrylic urethane-based paint or the like may be used.

Of these, since the polyamide composition according to the present embodiment has excellent mechanical strength, toughness, heat resistance, and vibration fatigue resistances, the polyamide composition is preferably used as a material for automobile parts. Furthermore, since the polyamide composition has excellent slidability, the polyamide composition is particularly preferably used as a material for gear and bearing parts. Since the polyamide composition has excellent mechanical strength, toughness, heat resistance, and dimensional stability, the polyamide composition is preferably used as a material for electric and electronic parts.

EXAMPLES

Hereinafter, the present embodiment will be more specifically described using Examples and Comparative Examples. However, the present embodiment is not limited to only these Examples.

The raw materials and measurement methods used in Examples and Comparative Examples are shown below.

In the present Examples, 1 Kg/cm$^2$ means 0.098 MPa.

[Raw Materials]

The following compounds were used in Examples and Comparative Examples.

<Dicarboxylic Acid>

(1) 1,4-Cyclohexanedicarboxylic acid (CHDC)

Trade name: 1,4-CHDA HP Grade (trans/cis=25/75) (manufactured by Eastman Chemical Company)

(2) Sebacic acid (C10DC)

Trade name: Sebacic acid TA (manufactured by Itoh Oil Chemicals Co., Ltd.)

(3) Isophthalic acid (IPA) (manufactured by Wako Pure Chemical Industries, Ltd.)

(4) Adipic acid (ADA) (manufactured by Wako Pure Chemical Industries, Ltd.)
<Diamine>
(1) 1,10-Diaminodecane(1,10-decamethylenediamine) (C10DA)
Trade name: 1,10-Decanediamine (manufactured by Kokura Synthetic Industries, Ltd.)
(2) 1,12-Diaminododecane (1,12-dodecamethylene diamine) (C12DA) (manufactured by Tokyo Chemical Industries Co., Ltd.)
(3) 1,6-Diaminohexane (1,6-hexamethylene diamine) (C6DA) (manufactured by Tokyo Chemical Industries Co., Ltd.)
(4) 2-Methylpentamethylenediamine (2MC5DA) (manufactured by Tokyo Chemical Industries Co., Ltd.)
(5) Octamethylenediamine (C8DA) (manufactured by Tokyo Chemical Industries Co., Ltd.)
(6) Undecamethylenediamine (C11DA) (manufactured by Tokyo Chemical Industries Co., Ltd.)
(7) 1,9-Nonamethylenediamine (C9DA) (manufactured by Aldrich)
(8) 2-Methyloctamethylenediamine (2MOD) produced by reference to a production method described in Japanese Patent Laid-Open No. 05-17413
<Lactam and/or Aminocarboxylic Acid>
(1) ε-caprolactam (CPL) (manufactured by Wako Pure Chemical Industries, Ltd.)
<Inorganic Filler>
(1) Glass fiber (GF-1), trade name ECS03T275H, number average fiber diameter (average particle size): 10 μm (cross-sectional shape: true circular shape), cut length: 3 mm, manufactured by Nippon Electric Glass Co., Ltd.
(2) Glass fiber (GF-2) processed by a sizing agent containing a maleic anhydride copolymer, as described in the following production example A, number average fiber diameter of GF-2: 7 μm (cross-sectional shape: true circular shape)
[Production Example of Glass Fiber]
<Production Example A>
First, as a solid content, a polyurethane resin, a maleic anhydride-butadiene copolymer, γ-aminopropyl triethoxysilane, and carnauba wax were diluted with water so that 2 mass % of the polyurethane resin, 4 mass % of the maleic anhydride-butadiene copolymer, 0.6 mass % of the γ-aminopropyl triethoxysilane, and 0.1 mass % of the carnauba wax were set, to obtain a glass fiber sizing agent.

The obtained glass fiber sizing agent was made to adhere to a glass fiber melted and spun and having a number average fiber diameter of 7 μm by an applicator while the glass fiber was wound around a rotation drum.

Then, a roving of a glass fiber bundle subjected to a surface treatment with the glass fiber sizing agent was obtained by drying the glass fiber to which the glass fiber sizing agent was made to adhere.

At that time, the bundle including 1,000 of the glass fibers was produced. The adhesion amount of the glass fiber sizing agent to the glass fiber was 0.6 mass %. This was cut in a length of 3 mm, to obtain a chopped strand (hereinafter, sometimes abbreviated as "GF-2").

In Examples, an average fiber diameter of the glass fiber was measured as follows.

First, a polyamide composition was put in an electric furnace for thermal disposal of an organic substance contained therein. From a residue of the thermal disposal, 100 or more glass fibers were arbitrarily selected to be observed with a scanning electron microscope (SEM), and thus, fiber diameters of these glass fibers were measured to obtain a number average fiber diameter.

[Measurement Methods]
(Content of Each Constituent Unit in Polyamide)
The content of each constituent unit in a polyamide was quantified as follows by $^1$H-NMR measurement.

Pellets of a polyamide obtained in each of Examples and Comparative Examples were dissolved in hexafluoroisopropanol deuteride by heating so that the concentration was set to about 5 mass %. The obtained solution was analyzed by $^1$H-NMR using a nuclear magnetic resonance analyzing device "JNM ECA-500" manufactured by JEOL Ltd., and an integration ratio was calculated to determine the following content.

(1) Peak Melting Temperature (Melting Point), Crystallization Peak Temperature, and Crystallization Enthalpy The peak melting temperature (melting point), the crystallization peak temperature, and the crystallization enthalpy of a polyamide obtained in each of Examples and Comparative Examples were measured by using Diamond-DSC, manufactured by PERKIN-ELMER Inc., based on JIS-K7121.

The measurement was carried out under a nitrogen atmosphere.

First, a condition of increasing the temperature of a specimen of approximately 10 mg from 50° C. to 350° C. at a rate of temperature increase of 20° C./min was set. An endothermic peak appearing during the temperature increase was taken as a melting peak, and a peak appearing at the highest temperature was taken as a peak melting temperature $T_{pm}$.

Subsequently, the temperature was kept at 350° C. for 3 minutes and lowered from 350° C. to 50° C. at a rate of temperature decrease of 20° C./min. An exothermic peak appearing during the temperature decrease was taken as a crystallization peak; the temperature was taken as a crystallization peak temperature $T_{pc-1}$; and a crystallization peak area was taken as crystallization enthalpy.

Subsequently, after keeping the temperature at 50° C. for 3 minutes, the temperature was increased again from 50° C. to 350° C. at a rate of temperature increase of 20° C./min. A peak appearing at the highest temperature during the temperature increase was taken as a peak melting temperature $T_{pm-1}$, and a peak appearing at the lowest temperature was taken as a peak melting temperature $T_{pm-2}$.

Furthermore, after keeping the temperature at 350° C. for 3 minutes, the temperature was lowered from 350° C. to 50° C. at a rate of temperature decrease of 50° C./min. A crystallization peak temperature appearing during the temperature decrease was taken as a crystallization peak temperature $T_{pc-2}$.

There were measured a difference $(T_{pm}-T_{pm-1})$ between the peak melting temperature $T_{pm}$ and the peak melting temperature $T_{pm-1}$, a difference $(T_{pm-1}-T_{pm-2})$ between the peak melting temperature $T_{pm-1}$ and the peak melting temperature $T_{pm-2}$, a difference $(T_{pc-1}-T_{pc-2})$ between the crystallization peak temperature $T_{pc-1}$ and the crystallization peak temperature $T_{pc-2}$, and a difference $(T_{pc-1}-Tg)$ between the crystallization peak temperature $T_{pc-1}$ and a glass transition temperature Tg described below.

(2) Glass Transition Temperature

The glass transition temperature (Tg) of a polyamide obtained in each of Examples and Comparative Examples was measured by using Diamond-DCS, manufactured by PERKIN-ELMER Inc., based on JIS-K7121.

Measurement conditions were as follows.

A molten sample obtained by melting a specimen with a hot stage (EP80, manufactured by Mettler) was rapidly cooled by using liquid nitrogen, to solidify the sample for use as a measurement sample.

Using 10 mg of the measurement sample, the temperature was increased to a range of 30 to 350° C. at a rate of temperature increase of 20° C./min, and the glass transition temperature Tg was measured.

(3) Sulfuric Acid Relative Viscosity ηr at 25° C.

The sulfuric acid relative viscosity ηr at 25° C. of a polyamide obtained in each of Examples and Comparative Examples was measured based on JIS-K6920. Specifically, 98% sulfuric acid was used for preparing a 1% concentration dissolving solution (at a ratio of (1 g of polyamide)/(100 mL of 98% sulfuric acid)), and the sulfuric acid relative viscosity ηr was measured under temperature conditions of 25° C. using the obtained dissolving solution.

(4) Mw (Weight Average Molecular Weight)/Mn (Number Average Molecular Weight)

Mw (weight average molecular weight)/Mn (number average molecular weight) of a polyamide obtained in each of Examples and Comparative Examples was calculated by using Mw (weight average molecular weight) and Mn (number average molecular weight) measured by GPC (gel permeation chromatography, HLC-8020, hexafluoroisopropanol solvent, based on a PMMA (polymethylmethacrylate) standard sample (manufactured by Polymer Laboratories), manufactured by Tosoh Corporation).

(5) Trans Isomer Ratio

The trans isomer ratio in a polyamide obtained in each of Examples and Comparative Examples was determined as follows.

30 to 40 mg of a polyamide was dissolved in 1.2 g of hexafluoroisopropanol deuteride, and the trans isomer ratio was measured using the obtained solution by $^1$H-NMR.

For 1,4-cyclohexanedicarboxylic acid, the trans isomer ratio in the polyamide was determined from the ratio of the peak surface area at 1.98 ppm derived from trans isomers and the peak surface areas at 1.77 ppm and 1.86 ppm derived from cis isomers in the $^1$H-NMR measurement.

(6) Ratio ($\eta^*1/\eta^*100$) of Shear Viscosity at Angular Velocity of 1 Rad/s to Shear Viscosity at Angular Velocity of 100 Rad/s A test piece was produced from pellets of a polyamide obtained in each of Examples and Comparative Examples using a compression molding machine.

Specifically, molding was conducted under conditions of a processing temperature set to the peak melting temperature ($T_{pm-1}$) obtained at the higher temperature of the polyamide +20° C., residual heat time of 2 minutes, heating time of 2 minutes, and cooling time of 3 minutes.

Melt viscoelasticity measurement was carried out by using the obtained molded piece and ARES-G2 (manufactured by TA Instruments Japan Inc.). There were set a measurement mode: Oscillation Frequency Sweep Test, measuring jigs: corn & plate, a gap spacing: 0.05 mm, stable time: 5 minutes, distortion: 20%, an angular velocity: 0.01 rad/sec to 100 rad/sec, a load cell: 2 kg, an environmental state: nitrogen air current, and a measurement temperature: the peak melting temperature ($T_{pm-1}$) obtained at the higher temperature of the polyamide +20° C.

A ratio ($\eta^*1/\eta^*100$) of a shear viscosity ($\eta^*1$) at an angular velocity of 1 rad/s to a shear viscosity ($\eta^*100$) at an angular velocity of 100 rad/s was calculated. ($\eta^*1/\eta^*100$) of 3 or less was evaluated to provide good flow properties.

(7) Amount of Amino Terminals ([$NH_2$])

The amount of amino terminals bonded to polymer terminals in a polyamide obtained in each of Examples and Comparative Examples was measured by the neutralization titration as follows:

A solution obtained by dissolving 3.0 g of polyamide in 100 mL of a 90 mass % phenol aqueous solution was used for titration with 0.025 N hydrochloric acid, to obtain the amount (μequivalent/g) of amino terminals. The end point was determined in accordance with an indicated value of a pH meter.

(8) Amount of Carboxyl Terminals ([COOH])

The amount of carboxyl terminals bonded to polymer terminals in a polyamide obtained in each of Examples and Comparative Examples was measured by the neutralization titration as follows:

A solution obtained by dissolving 4.0 g of a polyamide in 50 mL of benzyl alcohol was used for titration with 0.1 N NaOH, to obtain the amount (μ equivalent/g) of carboxyl terminals. The end point was determined in accordance with change in color of a phenolphthalein indicator.

([$NH_2$]/([$NH_2$]+[COOH])) was calculated in accordance with the amount of amino terminals ([$NH_2$]) and the amount of carboxyl terminals ([COOH]) measured in the items (7) and (8).

(9) Ratio Between the Number of Carbon Atoms and the Number of Amide Groups (Carbon Atom Number/Amide Group Number)

An average value of the number of carbon atoms per amide group (carbon atom number/amide group number) was obtained by calculation in a polyamide obtained in each of Examples and Comparative Examples.

Specifically, a ratio between the number of carbon atoms and the number of amide groups (carbon atom number/amide group number) was determined by dividing the number of carbon atoms contained in a molecular main chain by the number of amide groups contained in the molecular main chain.

The ratio between the number of carbon atoms and the number of amide groups (carbon atom number/amide group number) was used as an index corresponding to an amino group concentration in the polyamide.

(10) Biomass Plastic Ratio

In a polyamide obtained in each of Examples and Comparative Examples, the mass % of units constituted by biomass-derived raw materials was calculated as a biomass plastic ratio.

Specifically, sebacic acid and 1,10-diaminodecane obtained from castor oil used as a raw material were regarded as the biomass-derived raw materials.

In a polyamide obtained in each of Examples and Comparative Examples, a ratio of the units derived from sebacic acid and 1,10-diaminodecane was calculated, and the ratio was taken as the biomass plastic ratio.

The calculation was conducted in considering that two hydrogen atoms of a diamine, two oxygen atoms of a dicarboxylic acid and two hydrogen atoms produce 2 moles of water molecules in formation of an amide bond in the polymerization of a polyamide.

(11) Tensile Strength

Pellets of a polyamide obtained in each of Examples and Comparative Examples were molded into a molded piece of multipurpose test piece type A based on ISO 3167 by using an injection molding machine [PS-40E; manufactured by Nissei Plastic Industrial Co., Ltd.]. Specifically, the molding was conducted under conditions of injection+holding time of 25 seconds, cooling time of 15 seconds, a die temperature of 80° C. and a melt resin temperature set to the peak melting temperature ($T_{pm-1}$) obtained at the higher temperature of the polyamide +20° C.

The obtained molded piece of multipurpose test piece type A was subjected to a tensile test based on ISO 527 at 23° C. and a tension speed of 50 mm/min, to measure tensile yield stress, which was taken as the tensile strength.

The temperature was set to 120° C., and the tensile strength at 120° C. was measured under the same conditions as above except for the temperature condition.

(12) Water Absorption Rate

The pre-test mass (mass before water absorption) of the molded piece of multipurpose test piece type A molded as described in the item (11) above was measured in a post-molding dry state (dry as mold) attained after the molding of the molded piece of multipurpose test piece type A. Then, the molded piece of multipurpose test piece type A was dipped in 80° C. pure water for 72 hours. The molded piece of multipurpose test piece type A was then removed from the water, and moisture adhering to the surface was wiped off. The test piece was then left for 30 minutes under a constant-temperature constant-humidity (23° C., 50 RH %) atmosphere, and the post-test mass (mass after water absorption) was measured. The increase in the mass after water absorption compared with the mass before water absorption was taken as the water absorption amount. The average value of the water absorption amount with respect to the mass before water absorption for the number of test runs n=3 was taken as the water absorption rate.

(13) Blocking Properties

Pellets of a polyamide obtained in each of Examples and Comparative Examples were subjected to melt kneading by using a twin-screw extruder [ZSK-26MC; manufactured by Coperion GmbH (Germany)] having L/D (the length of a cylinder of the extruder/the diameter of the cylinder of the extruder)=48 (the number of barrels: 12) with a temperature from an upstream feed opening to a die of the extruder set to 340° C., at a screw revolution speed of 200 rpm, and an output rate of 25 kg/h. A strand in a length of 1.5 m extruded from the die was dipped in a water bath at 20° C. and then cut with a strand cutter into pellets. Herein, the dipping time in the water bath was set to about 2 seconds. 5 kg of the obtained pellets were introduced into a stainless steel funnel with an angle of 45 degrees, an inlet diameter of 500 mm, and an outlet diameter of 50 mm, to measure a ratio of the polyamide pellets blocking one another and remaining in an upper portion of the funnel.

(14) Mold Release Properties

From a polyamide obtained in each of Examples and Comparative Examples, a molded piece with a length of 128 mm, a width of 12.8 mm, and a thickness of 0.75 mm was molded by using the injection molding machine [PS-40E; manufactured by Nissei Plastic Industrial Co., Ltd.] used in the item (11) with injection+holding time set to 5 seconds, a die temperature set to the same temperature as the Tg of the polyamide, and a melt resin temperature set to the peak melting temperature ($T_{pm-1}$) obtained at the higher temperature of the polyamide +20° C. Cooling time was adjusted, so that the shortest cooling time at which a molded article was smoothly released from a die was evaluated as the mold release properties. Reduction of the cooling time was considered to lead to improvement of the productivity.

(15) Evaluation of Plasticizing Time Stability

Pellets of a polyamide obtained in each of Examples and Comparative Examples were molded into a molded piece of multipurpose test piece type A based on ISO 3167 by using an injection molding machine [PS-40E; manufactured by Nissei Plastic Industrial Co., Ltd.].

Specifically, the molding was conducted under conditions of injection+holding time of 25 seconds, cooling time of 15 seconds, a die temperature of 120° C., and a melt resin temperature set to the peak melting temperature ($T_{pm-1}$) obtained at the higher temperature of the polyamide +20° C. The molding was carried out by 1000 shots, to obtain ISO test pieces.

In each shot of the injection molding, time elapsed until a pellet of the polyamide was plasticized (hereinafter, also referred to as the "plasticizing time") was measured. On the basis of the measured values, plasticizing time stability (standard deviation) was determined in accordance with the following expression:

Plasticizing time stability (standard deviation) = [Expression 1]
$$\sqrt{\frac{1}{n}\sum_{i=1}^{n}(Ai - X1)^2}$$

$$X1 = \frac{1}{n}\sum_{i=1}^{n} Ai$$

Ai=plasticizing time of each of 1000 shots
X1=arithmetic mean of plasticizing times of 1000 shots As the standard deviation (σ) was smaller, the polyamide was considered to be more excellent in the plasticizing time stability.

(16) Polymerization Yield in Melt Polymerization

From the amount of pellets of a polyamide obtained in each of Examples and Comparative Examples, the polymerization yield of a resin in the polymerization was evaluated.

A ratio of the obtained pellets to a theoretical polyamide amount obtained from an equimolar about 50 mass % uniform aqueous solution of raw material monomers charged into an autoclave was calculated.

Hereinafter, the evaluation basis will be shown.
Very good: polymerization yield of 90% or more
Good: polymerization yield of 85 to 90%
Fair: polymerization yield of 80 to 85%
Poor: polymerization yield of 80% or less

(17) Vibration Fatigue Resistances: Breaking Stress (MPa)

The breaking stress (MPa) was measured by using a dumbbell injection molding test piece (3 mm thick) for ASTM tensile tests based on ASTM D638.

The dumbbell injection molding test piece was molded from pellets of a polyamide composition obtained in each of Examples and Comparative Examples as follows.

A dumbbell test piece (3 mm thick) die (die temperature=Tg+20° C.) for ASTM tensile tests (ASTM D638) was mounted on an injection molding machine (PS40E, manufactured by Nissei Plastic Industrial Co., Ltd.), and molding was conducted at a cylinder temperature of ($T_{pm-1}$+10)° C. to ($T_{pm-1}$+30)° C., to obtain the dumbbell injection molding test piece from the pellets of the polyamide composition.

The obtained dumbbell injection molding test piece (3 mm thick) for ASTM tensile tests was loaded with a tension load by a sinusoidal wave of a frequency of 20 Hz under a 120° C. atmosphere using a hydraulic servo fatigue test machine EHF-50-10-3, manufactured by Saginomiya Seisakusho Co., Ltd., to determine the breaking stress (MPa) at 100,000 times. As the determined breaking stress (MPa) was larger, the polyamide composition was evaluated to be more excellent in the vibration fatigue resistances.

(18) Surface Appearance (Gloss at 60° C.)

A flat plate molded piece was produced from pellets of a polyamide composition obtained in each of Examples and Comparative Examples as follows.

An injection molding machine [FN-3000; manufactured by Nissei Plastic Industrial Co., Ltd.] was used with cooling time set to 25 seconds, a screw revolution speed set to 200 rpm, a die temperature set to Tg+20° C., and a cylinder temperature set to $(T_{pm-1}+10)°$ C. to $(T_{pm-1}+30)°$ C., and the injection pressure and the injection speed were appropriately adjusted to attain filling time of 1.0±0.1 sec, and thereby, a flat plate molded piece (13 cm×13 cm, 1 mm thick) was produced from the polyamide composition pellets.

The gloss at 60° C. was measured in a center portion of the produced flat plate molded piece by using a gloss meter (IG320 manufactured by HORIBA Ltd.) based on JIS-K7150.

As the measured value was larger, the polyamide composition was evaluated to be more excellent in the surface appearance.

(19) Copper Concentration, Halogen Concentration, and Molar Ratio Between Halogen and Copper (Halogen/Cu)

In pellets of a polyamide composition obtained in each of Examples and Comparative Examples, a copper concentration, a halogen concentration, and a molar ratio between halogen and copper (halogen/Cu) were measured as follows.

The copper concentration was quantified by charging sulfuric acid into a specimen, adding nitric acid to the resultant mixture while heating to decompose the organic component, maintaining the volume of the decomposition solution constant with pure water, and by quantifying the concentration by ICP emission analysis (high-frequency plasma emission analysis). Vista-Pro manufactured by Seiko Instruments & Electronics Ltd. was used for an ICP emission analysis apparatus.

The halogen concentration was quantified by, using iodine as an example, combusting a specimen in a flask purged with high-purity oxygen, trapping the produced gas in an absorbing solution, and quantifying the iodine in the trapped solution using potentiometric titration with a 1/100 N silver nitrate solution.

The molar ratio of halogen and copper (halogen/Cu) was calculated by using the respective quantified values and converting the molecular weights into moles.

(20) Strength Half-Life (Days)

The strength half-life (days) of pellets of a polyamide composition obtained in each of Examples and Comparative Examples was measured as follows.

The dumbbell injection molding test piece (3 mm thick) for ASTM tensile tests described in the item (17) was treated for a predetermined period in a hot-air oven at 200° C., and the tensile strength was measured based on ASTM-D638. Then, the tensile strength after the heat treatment as compared with the tensile strength before the heat treatment was calculated as a tensile strength retention rate. The heat treatment time at which the tensile strength retention rate was 50% was taken as the strength half-life.

(21) Tensile Strength Retention Rate after Dipping (%)

The tensile strength retention rate (%) after dipping pellets of a polyamide composition obtained in each of Examples and Comparative Examples was measured as follows.

The dumbbell injection molding test piece (3 mm thick) for the ASTM tensile tests described in the item (17) was dipped for 24 hours or 720 hours in a 120° C. aqueous solution of 50% ethylene glycol. After leaving at room temperature, the tensile test of the item (11) was carried out to measure tensile strength. A ratio of the tensile strength measured after dipping for 720 hours to the tensile strength measured after dipping for 24 hours was determined as the tensile strength retention rate after dipping.

(22) Wear Depth (μm)

The multipurpose test piece (A type) produced in the item (11) was subjected to a reciprocal test at 100,000 times at an environmental temperature of 23° C. under conditions of a load of 150 g, a linear velocity of 400 mm/sec, and a reciprocating distance of 30 mm, by a reciprocal frictional wear test apparatus (AFT-15MS: manufactured by Toyo Precision Parts Mfg. Co. Ltd.). As an opposite material, a SUS ball (SUS304, R=2.5 mm) was used.

Rmax in the scraped portion of the multipurpose test piece subjected to the reciprocal test was measured by using a surface roughness meter (Surfcom: manufactured by Tokyo Seimitsu Co., Ltd.), to evaluate a wear depth.

Hereinafter, Examples and Comparative Examples of the polyamide will be described. The measurement items measured as above are also described.

Example 1

Production of Polyamide

A polyamide polymerization reaction was carried out by "hot melt polymerization" as follows.

750 g (4.35 mol) of (a) CHDC as an alicyclic dicarboxylic acid, and 750 g (4.35 mol) of (b) C10DA as a diamine having 8 or more carbon atoms were dissolved in 1,500 g of distilled water, to prepare an equimolar about 50 mass % uniform aqueous solution of raw material monomers.

The obtained aqueous solution and 17 g (0.10 mol) of (b) C10DA as an additive in melt polymerization were charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank (hereinafter, sometimes referred to simply as "in the tank") was, in terms of gauge pressure (hereinafter, pressure in the tank is always expressed as gauge pressure), about 2.5 kg/cm$^2$ (the solution temperature in this system was about 145° C.). While removing water from the system to maintain the pressure in the tank at about 2.5 kg/cm$^2$, heating was continued so that the concentration of the aqueous solution was concentrated to about 75 mass % (the solution temperature in this system was about 160° C.). Removal of water was stopped, and then heating was continued until the pressure in the tank was about 30 kg/cm$^2$ (the solution temperature in this system was about 245° C.) While removing water from the system to maintain the pressure in the tank at about 30 kg/cm$^2$, heating was continued until 50° C. below (here, 300° C.) the final temperature (350° C., described later). After the solution temperature increased to 50° C. below (here, 300° C.) the final temperature (350° C., described later), while continuing heating, the pressure in the tank was lowered over about 30 minutes to atmospheric pressure (gauge pressure of 0 kg/cm$^2$).

Subsequently, the heater temperature was adjusted so that the final temperature of the resin temperature (solution temperature) in the tank was about 350° C. With the resin temperature at about 350° C., the tank contents were kept for 10 minutes under a reduced pressure of about 13.3 kPa (about 100 torr) by a vacuum apparatus, to obtain a polymer. Then, the pressure was increased with nitrogen, to form the obtained polymer into a strand from a lower spinneret (nozzle). The strand was water cooled, cut, and then discharged in pellet form, to obtain pellets of a polyamide.

(Production of Polyamide Composition)

A polyamide composition was produced by using the polyamide and a glass fiber.

The polyamide composition was produced by using a twin-screw extruder (TEM 35, manufactured by Toshiba Machine Co., Ltd., L/D=47.6 (D=37 mmφ), set temperature Tm2+20° C. (in a case using the polyamide obtained in Example 1, 325+20=345° C.), screw revolution speed 300 rpm) as follows. The polyamide (100 parts by mass) with the moisture content adjusted as described above was fed from a top feed opening provided at the uppermost upstream portion of the twin-screw extruder. A glass fiber, used as an inorganic filler, in a mass ratio of (polyamide:glass fiber (GF)=50:50) was fed from a side feed opening provided on a downstream side of the twin-screw extruder (in which the resin fed from the top feed opening was in a sufficiently molten state). A melt kneaded product extruded from a die head was cooled in a strand form, which was pelletized to form pellets of the polyamide composition.

The respective physical properties of the obtained polyamide and polyamide composition were measured in accordance with the methods.

The measurement results are shown in Table 3.

Examples 2 to 12

A polyamide polymerization reaction ("hot melt polymerization") was carried out by the method described in Example 1, except that the compounds and amounts shown in Table 1 were used for the (a) alicyclic dicarboxylic acid, (b) diamine having 8 or more carbon atoms, (c) copolymer component, and additives in the melt polymerization, and that the resin final temperature was the temperature shown in Table 1, to obtain pellets of a polyamide.

Measurements were carried out on the respective physical properties of the obtained polyamide based on the above-described methods.

The measurement results are shown in Table 3.

After the polyamide was produced by the method described in Example 1 using the obtained polyamide, the respective physical properties of the polyamide composition were measured in accordance with the methods.

The measurement results are shown in Table 3.

Comparative Example 1

A polyamide polymerization reaction was carried out by "hot melt polymerization" as follows.

750 g (4.35 mol) of (a) CHDC as an alicyclic dicarboxylic acid, and 750 g (4.35 mol) of (b) C10DA as a diamine having 8 or more carbon atoms were dissolved in 1,500 g of distilled water, to prepare an equimolar about 50 mass % uniform aqueous solution of raw material monomers.

The obtained aqueous solution was charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank was, in terms of gauge pressure (hereinafter, pressure in the tank is always expressed as gauge pressure), about 2.5 kg/cm$^2$ (the solution temperature in this system was about 145° C.) While removing water from the system to maintain the pressure in the tank at about 2.5 kg/cm$^2$, heating was continued so that the concentration of the aqueous solution was concentrated to about 75 mass % (the solution temperature in this system was about 160° C.). Removal of water was stopped, and then heating was continued until the pressure in the tank was about 30 kg/cm$^2$ (the solution temperature in this system was about 245° C.) While removing water from the system to maintain the pressure in the tank at about 30 kg/cm$^2$, heating was continued until 50° C. below (here, 310° C.) the final temperature (360° C., described later). After the solution temperature increased to 50° C. below (here, 310° C.) the final temperature (360° C., described later), while continuing heating, the pressure in the tank was lowered over about 120 minutes to atmospheric pressure (gauge pressure of 0 kg/cm$^2$).

Subsequently, the heater temperature was adjusted so that the final temperature of the resin temperature (solution temperature) was about 325° C. With the resin temperature at about 325° C., the tank contents were kept for 25 minutes under a reduced pressure of about 13.3 kPa (about 100 torr) by a vacuum apparatus, to obtain a polymer. Then, the pressure was increased with nitrogen, to form the obtained polymer into a strand from a lower spinneret (nozzle). The strand was water cooled, cut, and then discharged in pellet form, to obtain pellets of a polyamide.

The respective physical properties of the obtained polyamide were measured in accordance with the methods.

The measurement results are shown in Table 4.

After a polyamide composition was produced by the method described in Example 1 using the obtained polyamide, and the respective physical properties of the polyamide composition were measured in accordance with the methods.

The measurement results are shown in Table 4.

Comparative Example 2

A polyamide polymerization reaction ("hot melt polymerization") was carried out by the method described in Comparative Example 1, except that the compounds and amounts shown in Table 1 were used for the (a) alicyclic dicarboxylic acid, (b) diamine having 8 or more carbon atoms, and (c) copolymer component, and that the resin final temperature was the temperature shown in Table 2, to obtain pellets of a polyamide.

The respective physical properties of the obtained polyamide were measured in accordance with the methods.

The measurement results are shown in Table 4.

A polyamide composition was produced by the method described in Example 1 using the obtained polyamide, and the respective physical properties of the polyamide composition were measured in accordance with the methods.

The measurement results are shown in Table 4.

Comparative Example 3

A polyamide polymerization reaction was carried out by the method described in Comparative Example 1, except that the compounds and amounts shown in Table 2 were used for the (a) alicyclic dicarboxylic acid, (b) diamine having 8 or more carbon atoms, and (c) copolymer component, that the resin final temperature in the melt polymerization was the temperature shown in Table 2, and that the tank contents were kept for 25 minutes under a reduced pressure of about 53.3 kPa (about 400 torr) by a vacuum apparatus in a state where the resin temperature was the final temperature described in Table 2, to obtain pellets of a polyamide.

The respective physical properties of the obtained polyamide were measured in accordance with the methods.

The measurement results are shown in Table 4.

After a polyamide composition was produced by the method described in Example 1 using the obtained polyamide, the respective physical properties of the polyamide composition were measured in accordance with the methods.

The measurement results are shown in Table 4.

Comparative Example 4

A polyamide polymerization reaction was carried out by the method described in Example 1, except that the compounds and amounts shown in Table 2 were used for the (a) alicyclic dicarboxylic acid, (b) diamine having 8 or more carbon atoms, and (c) copolymer component, that the resin final temperature in the melt polymerization was the temperature shown in Table 2, and that the tank contents were kept for 3 minutes under a reduced pressure of about 80 kPa (about 600 torr) by a vacuum apparatus in a state where the resin temperature was the final temperature described in Table 2, to obtain pellets of a polyamide.

The respective physical properties of the obtained polyamide were measured in accordance with the methods.

The measurement results are shown in Table 4.

After a polyamide composition was produced by the method described in Example 1 using the obtained polyamide, the respective physical properties of the polyamide composition were measured in accordance with the methods.

The measurement results are shown in Table 4.

Comparative Example 5

A polyamide polymerization reaction was carried out by the "hot melt polymerization" as follows.

The polymerization was conducted in accordance with a production method described in Patent Literature 7 (Japanese Patent Publication No. 64-2131) described above.

An equimolar about 80 mass % uniform aqueous solution of raw material monomers was produced by dissolving 1007 g (5.85 mol) of (a) CHDC, 832 g (4.46 mol) of (b) C11DA, and 161 g (1.39 mol) of (c-2) C6DA in 500 g of distilled water.

The obtained aqueous solution was charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. to 210° C., and the heating was continued while removing water from the system to maintain the pressure in the autoclave tank, in terms of gauge pressure (hereinafter, pressure in the tank is always expressed as gauge pressure), at 17.5 kg/cm². Thereafter, the internal temperature was increased to 320° C., and the pressure in the tank was lowered over about 120 minutes to atmospheric pressure (gauge pressure of 0 kg/cm²). Subsequently, a nitrogen gas was allowed to flow through the tank for 30 minutes, and the heater temperature was adjusted so that the final temperature of the resin temperature (solution temperature) was about 323° C., to obtain a polymer. Then, the pressure was increased with nitrogen, to form the obtained polymer into a strand from a lower spinneret (nozzle). The strand was water cooled and cut, to be discharged in the form of pellets. Thus, the pellets of a copolymer polyamide were obtained.

The respective physical properties of the obtained polyamide were measured in accordance with the methods.

The measurement results are shown in Table 4.

After a polyamide composition was produced by the method described in Example 1 using the obtained polyamide, the respective physical properties of the polyamide composition were measured in accordance with the methods.

The measurement results are shown in Table 4.

Comparative Example 6

A polyamide polymerization reaction was carried out by "prepolymer/solid phase polymerization" as follows.

The polymerization was conducted in accordance with a method described in Patent Literature 8 (WO 2002/048239) described above.

The polyamide polymerization reaction was carried out by "prepolymer/solid phase polymerization".

An equimolar 50 mass % aqueous solution containing raw material monomers was produced by dissolving 1251.2 g (7.266 mol) of (a) CHDA, 1048.2 g (7.266 mol) of (b) C8DA in 3000 g of distilled water.

Heating was continued from a solution temperature of about 50° C. until the pressure in the autoclave tank was, in terms of gauge pressure (hereinafter, pressure in the tank is always expressed as gauge pressure), about 2.5 kg/cm².

While removing water from the system to maintain the pressure in the tank at about 2.5 kg/cm², heating was continued so that the concentration of the aqueous solution was concentrated to about 70 mass %.

Then, the internal temperature was raised to 218° C. At this time, pressure was raised to 22 Kg/cm² in the autoclave. The reaction was continued for 1 additional hour until the internal temperature reached 253° C., while the pressure was maintained at 22 Kg/cm² by gradually removing steam, to obtain a prepolymer with a number average molecular weight (Mn) of 5,000.

The obtained polyamide was crushed to pieces having a size of 3 mm or less and dried at 100° C. for 24 hours, under nitrogen gas stream at a flow rate of 20 L/min. The dried prepolymer was extruded using a kneader type reaction extruder (BT-30 manufactured by Plastic Engineering Institute Co. Ltd.) under the conditions of 300° C., reduced pressure of 0.03 MPa, and residence time of 10 minutes, to obtain a polyamide.

The respective physical properties of the obtained polyamide were measured in accordance with the methods.

The measurement results are shown in Table 4.

A polyamide composition was produced by the method described in Example 1 using the obtained polyamide, and the respective physical properties of the polyamide composition were measured in accordance with the methods.

The measurement results are shown in Table 4.

Comparative Example 7

A polyamide polymerization reaction was carried out by "hot melt polymerization" as follows.

836 g (5.72 mol) of ADA and 664 g (5.72 mol) of HMD were dissolved in 1,500 g of distilled water, to prepare an equimolar about 50 mass % uniform aqueous solution of raw material monomers.

The obtained aqueous solution was charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank was, in terms of gauge pressure (hereinafter, pressure in the tank is always expressed as gauge pressure), about 2.5 kg/cm² (the solution temperature in this system was about 145° C.) While removing water from the system to maintain the pressure in the tank at about 2.5 kg/cm², heating was continued so that the concentration of the aqueous solution was concentrated to about 75 mass % (the solution temperature in this system was about 160° C.). Removal of water was stopped, and then heating was continued until the pressure in the tank was about 18 kg/cm² (the solution temperature in this system was about 245° C.) While removing water from the system to maintain the pressure in the tank at about 30 kg/cm², heating was continued until 20° C. below (here, 270° C.) the final temperature (290° C., described later). After the solution temperature increased to 20° C. below (here, 270° C.) the final temperature (290° C., described later), while continuing heating, the pressure in the tank was lowered over about 30 minutes to atmospheric pressure (gauge pressure of 0 kg/cm$^2$).

Subsequently, the heater temperature was adjusted so that the final temperature of the resin temperature (solution temperature) was about 290° C. With the resin temperature at about 290° C., the tank contents were kept for 25 minutes under a reduced pressure of about 13.3 kPa (about 100 torr) by a vacuum apparatus, to obtain a polymer. Then, the pressure was increased with nitrogen, to form the obtained polymer into a strand from a lower spinneret (nozzle). The strand was water cooled, cut, and then discharged in pellet form, to obtain pellets of a polyamide.

The respective physical properties of the obtained polyamide were measured in accordance with the methods.

The measurement results are shown in Table 4.

A polyamide composition was produced by the method described in Example 1 using the obtained polyamide, and the respective physical properties of the polyamide composition were measured in accordance with the methods.

The measurement results are shown in Table 4.

Comparative Example 8

A polyamide polymerization reaction was carried out by "hot melt polymerization" as follows.

836 g (5.72 mol) of ADA and 664 g (5.72 mol) of HMD were dissolved in 1,500 g of distilled water, to prepare an equimolar about 50 mass % uniform aqueous solution of raw material monomers.

The obtained aqueous solution was charged into an autoclave having an internal volume of 5.4 L (manufactured by Nitto Kouatsu Co., Ltd.). The autoclave was kept warm until the solution temperature (internal temperature) was 50° C., and then the contents of the autoclave were purged with nitrogen. Heating was continued from a solution temperature of about 50° C. until the pressure in the autoclave tank was, in terms of gauge pressure (hereinafter, pressure in the tank is always expressed as gauge pressure), about 2.5 kg/cm$^2$ (the solution temperature in this system was about 145° C.) While removing water from the system to maintain the pressure in the tank at about 2.5 kg/cm$^2$, heating was continued so that the concentration of the aqueous solution was concentrated to about 75 mass % (the solution temperature in this system was about 160° C.). Removal of water was stopped, and then heating was continued until the pressure in the tank was about 18 kg/cm$^2$ (the solution temperature in this system was about 245° C.) While removing water from the system to maintain the pressure in the tank at about 30 kg/cm$^2$, heating was continued until 20° C. below (here, 270° C.) the final temperature (290° C., described later). After the solution temperature increased to 20° C. below (here, 270° C.) the final temperature (290° C., described later), while continuing heating, the pressure in the tank was lowered over about 60 minutes to atmospheric pressure (gauge pressure of 0 kg/cm$^2$).

Subsequently, the heater temperature was adjusted so that the final temperature of the resin temperature (solution temperature) was about 290° C. With the resin temperature at about 290° C., the tank contents were kept for 25 minutes under a reduced pressure of about 13.3 kPa (about 100 torr) by a vacuum apparatus, to obtain a polymer. Then, the pressure was increased with nitrogen, to form the obtained polymer into a strand from a lower spinneret (nozzle). The strand was water cooled, cut, and then discharged in pellet form, to obtain pellets of a polyamide.

The respective physical properties of the obtained polyamide were measured in accordance with the methods.

The measurement results are shown in Table 4.

A polyamide composition was produced by the method described in Example 1 using the obtained polyamide, and the respective physical properties of the polyamide composition were measured in accordance with the methods.

The measurement results are shown in Table 4.

Comparative Example 9

A polyamide polymerization reaction ("hot melt polymerization") was carried out by the method described in Comparative Example 8, except that the resin final temperature was the temperature shown in Table 2, to obtain pellets of a polyamide.

The respective physical properties of the obtained polyamide were measured in accordance with the methods.

The measurement results are shown in Table 4.

A polyamide composition was produced by the method described in Example 1 using the obtained polyamide, and the respective physical properties of the polyamide composition were measured in accordance with the methods.

The measurement results are shown in Table 4.

TABLE 1

| | | | Example 1 | Example 2 | Example 3 | Example 4 | Example 5 | Example 6 | Example 7 |
|---|---|---|---|---|---|---|---|---|---|
| Constituent components of polyamide | (a) Alicyclic dicarboxylic acid | Kind | CHDC | CHDC | CHDC | CHDC | CHDC | CHDC | CHDC |
| | | g | 750 | 800 | 800 | 726 | 609 | 487 | 440 |
| | | mol | 4.35 | 4.65 | 4.65 | 4.22 | 3.54 | 2.83 | 2.55 |
| | (b) Diamine having 8 or more carbon atoms | Kind | C10DA | C10DA | C10DA | C12DA | C10DA | C10DA | C10DA |
| | | g | 750 | 520 | 520 | 675 | 609 | 755 | 756 |
| | | mol | 4.35 | 3.02 | 3.02 | 3.37 | 3.54 | 4.38 | 4.39 |
| | (c-1): Dicarboxylic acid other than (a) alicyclic dicarboxylic acid | Kind | | | | | C10DC | IPA | IPA |
| | | g | | | | | 179 | 258 | 305 |
| | | mol | | | | | 0.89 | 1.55 | 1.84 |
| | (c-2): Diamine having fewer carbon atoms than those of (b) diamine | Kind | | C6DA | 2MC5DA | C6DA | C6DA | | |
| | | g | | 189 | 189 | 99 | 103 | | |
| | | mol | | 1.63 | 1.63 | 0.85 | 0.89 | | |
| | (c-3): Lactam and/or aminocarboxylic acid | Kind | | | | | | | |
| | | g | | | | | | | |
| | | mol | | | | | | | |
| | Component added in | Kind | C10DA | C10DA | C10DA | C12DA | C10DA | C10DA | C10DA |
| | | g | 17 | 17 | 17 | 20 | 17 | 17 | 17 |

TABLE 1-continued

|  |  |  |  |  |  |  |  |  |  |
|---|---|---|---|---|---|---|---|---|---|
|  | polymerization | mol | 0.10 | 0.10 | 0.10 | 0.10 | 0.10 | 0.10 | 0.10 |
|  | Blend ratio of (c) copolymer component | mol % | 0 | 18 | 18 | 10 | 11 | 18 | 20 |
| Polymerization conditions | Polymerization method |  | Melt | Melt | Melt | Melt | Melt | Melt | Melt |
|  | Final temperature of melt polymerization | °C. | 350 | 330 | 320 | 320 | 320 | 315 | 315 |

|  |  |  |  | Example 8 | Example 9 | Example 10 | Example 11 | Example 12 |
|---|---|---|---|---|---|---|---|---|
| Constituent components of polyamide | (a) Alicyclic dicarboxylic acid | Kind | CHDC | CHDC | CHDC | CHDC | CHDC |
|  |  | g | 700 | 750 | 782 | 782 | 639 |
|  |  | mol | 4.06 | 4.35 | 4.54 | 4.54 | 3.71 |
|  | (b) Diamine having 8 or more carbon atoms | Kind | C10DA | C11DA | C9DA | C9DA | C8DA |
|  |  | g | 700 | 650 | 718 | 503 | 536 |
|  |  | mol | 4.06 | 3.49 | 4.54 | 3.18 | 3.71 |
|  | (c-1): Dicarboxylic acid other than (a) alicyclic dicarboxylic acid | Kind |  |  |  |  | ADA |
|  |  | g |  |  |  |  | 181 |
|  |  | mol |  |  |  |  | 1.24 |
|  | (c-2): Diamine having fewer carbon atoms than those of (b) diamine | Kind |  | C6DA |  | 2MOD | C6DA |
|  |  | g |  | 101 |  | 216 | 144 |
|  |  | mol |  | 0.86 |  | 1.36 | 1.24 |
|  | (c-3): Lactam and/or aminocarboxylic acid | Kind | CPL |  |  |  |  |
|  |  | g | 51 |  |  |  |  |
|  |  | mol | 0.45 |  |  |  |  |
|  | Component added in polymerization | Kind | C10DA | C11DA | C9DA | C9DA | C8DA |
|  |  | g | 17 | 19 | 16 | 16 | 14 |
|  |  | mol | 0.10 | 0.10 | 0.10 | 0.10 | 0.10 |
|  | Blend ratio of (c) copolymer component | mol % | 5 | 10 | 0 | 8 | 25 |
| Polymerization conditions | Polymerization method |  | Melt | Melt | Melt | Melt | Melt |
|  | Final temperature of melt polymerization | °C. | 340 | 310 | 335 | 320 | 335 |

TABLE 2

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Constituent components of polyamide | (a) Alicyclic dicarboxylic acid | Kind | CHDC | CHDC | CHDC | CHDC | CHDC | CHDC | ADA | ADA | ADA |
|  |  | g | 750 | 800 | 800 | 800 | 1007 | 1251 | 836 | 836 | 836 |
|  |  | mol | 4.35 | 4.65 | 4.65 | 4.65 | 5.85 | 7.27 | 5.72 | 5.72 | 5.72 |
|  | (b) Diamine having 8 or more carbon atoms | Kind | C10DA | C10DA | C10DA | C10DA | C11DA | C8DA |  |  |  |
|  |  | g | 750 | 520 | 520 | 520 | 832 | 1048 |  |  |  |
|  |  | mol | 4.35 | 3.02 | 3.02 | 3.02 | 4.46 | 7.27 |  |  |  |
|  | (c-1): Dicarboxylic acid other than (a) alicyclic dicarboxylic acid | Kind |  |  |  |  |  |  |  |  |  |
|  |  | g |  |  |  |  |  |  |  |  |  |
|  |  | mol |  |  |  |  |  |  |  |  |  |
|  | (c-2): Diamine having fewer carbon atoms than those of (b) diamine | Kind |  | C6DA | C6DA | C6DA | C6DA |  | HMD | HMD | HMD |
|  |  | g |  | 189 | 189 | 189 | 161 |  | 664 | 664 | 664 |
|  |  | mol |  | 1.63 | 1.63 | 1.63 | 1.39 |  | 5.72 | 5.72 | 5.72 |
|  | (c-3): Lactam and/or aminocarboxylic acid | Kind |  |  |  |  |  |  |  |  |  |
|  |  | g |  |  |  |  |  |  |  |  |  |
|  |  | mol |  |  |  |  |  |  |  |  |  |
|  | Component added in polymerization | Kind |  |  |  |  |  |  |  |  |  |
|  |  | g |  |  |  |  |  |  |  |  |  |
|  |  | mol |  |  |  |  |  |  |  |  |  |
|  | Blend ratio of (c) copolymer component | mol % | 0 | 18 | 18 | 18 | 12 | 0 | 0 | 0 | 0 |

TABLE 2-continued

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Polymerization conditions | Polymerization method |  | Melt | Melt | Melt | Melt | Melt | Prepolymer + solid phase | Melt | Melt | Melt |
|  | Final temperature of melt polymerization | °C. | 360 | 335 | 335 | 345 | 323 | 253 | 290 | 290 | 330 |

TABLE 3

|  |  |  | Example 1 | Example 2 | Example 3 | Example 4 | Example 5 | Example 6 | Example 7 |
|---|---|---|---|---|---|---|---|---|---|
| Trans isomer ratio |  | mol % | 70 | 70 | 70 | 70 | 70 | 70 | 70 |
| Peak melting temperature $T_{pm-1}$ |  | °C. | 334 | 315 | 310 | 308 | 307 | 298 | 295 |
| Peak melting temperature $T_{pm-2}$ |  | °C. | 300 | 302 | 297 | 273 | 290 | 283 | 280 |
| Difference between $T_{pm}$ and $T_{pm-1}$ |  | °C. | 6 | 5 | 6 | 6 | 6 | 5 | 6 |
| Difference between $T_{pm-1}$ and $T_{pm-2}$ |  | °C. | 34 | 13 | 13 | 35 | 17 | 15 | 15 |
| Crystallization peak temperature $T_{pc-1}$ in decreasing temperature at 20° C./min |  | °C. | 295 | 276 | 270 | 268 | 269 | 255 | 251 |
| Crystallization peak temperature $T_{pc-2}$ in decreasing temperature at 50° C./min |  | °C. | 282 | 267 | 260 | 249 | 259 | 245 | 241 |
| Difference between $T_{pc-1}$ and $T_{pc-2}$ |  | °C. | 13 | 9 | 10 | 19 | 10 | 10 | 10 |
| Crystallization enthalpy in decreasing temperature at 20° C./min |  | J/g | 35 | 36 | 34 | 29 | 34 | 33 | 29 |
| Glass transition temperature Tg |  | °C. | 111 | 121 | 126 | 110 | 94 | 103 | 105 |
| Difference between $T_{pc-1}$ and Tg |  | °C. | 184 | 155 | 144 | 158 | 175 | 152 | 146 |
| Sulfuric acid relative viscosity ηr at 25° C. |  |  | 2.4 | 2.6 | 2.5 | 2.4 | 2.5 | 2.5 | 2.3 |
| Mw (weight average molecular weight)/Mn (number average molecular weight) |  |  | 3.3 | 2.8 | 2.1 | 2.6 | 2.6 | 3.8 | 3.9 |
| η*1/η*100 |  |  | 2.9 | 2.8 | 1.4 | 2.5 | 2.6 | 2.9 | 3.5 |
| [NH2]/([NH2] + [COOH]) |  |  | 0.58 | 0.63 | 0.63 | 0.71 | 0.60 | 0.65 | 0.63 |
| Carbon atom number/amide group number |  |  | 9.0 | 8.3 | 8.3 | 9.4 | 8.8 | 9.0 | 9.0 |
| Biomass plastic ratio |  | % | 55 | 36 | 36 | 0 | 56 | 55 | 63 |
| Physical properties of polyamide | Tensile strength at 23° C. | MPa | 85 | 88 | 88 | 81 | 82 | 91 | 88 |
|  | Tensile strength at 120° C. | MPa | 50 | 65 | 70 | 45 | 50 | 51 | 52 |
|  | Water absorption rate | % | 2.3 | 2.6 | 2.6 | 2.3 | 2.2 | 1.7 | 1.9 |
|  | Blocking properties | % | 5 | 0 | 0 | 3 | 0 | 0 | 3 |
|  | Mold release properties | sec | 7 | 3 | 2 | 5 | 3 | 3 | 5 |
|  | Plasticizing time stability |  | 0.17 | 0.19 | 0.18 | 0.18 | 0.21 | 0.19 | 0.25 |
|  | Polymerization yield in melt polymerization |  | Good | Good | Very good | Good | Good | Good | Fair |
| Physical properties of polyamide composition (GF50%) | Vibration fatigue resistances | MPa | 74 | 80 | 85 | 71 | 65 | 70 | 67 |
|  | Surface appearance (gloss value at 60° C.) |  | 71 | 74 | 81 | 75 | 79 | 68 | 60 |

|  |  |  | Example 8 | Example 9 | Example 10 | Example 11 | Example 12 |
|---|---|---|---|---|---|---|---|
| Trans isomer ratio |  | mol % | 70 | 70 | 70 | 70 | 70 |
| Peak melting temperature $T_{pm-1}$ |  | °C. | 328 | 287 | 311 | 295 | 315 |
| Peak melting temperature $T_{pm-2}$ |  | °C. | 303 | 255 | 274 | 269 | 288 |
| Difference between $T_{pm}$ and $T_{pm-1}$ |  | °C. | 5 | 4 | 6 | 6 | 3 |
| Difference between $T_{pm-1}$ and $T_{pm-2}$ |  | °C. | 25 | 32 | 37 | 26 | 27 |
| Crystallization peak temperature $T_{pc-1}$ in decreasing temperature at 20° C./min |  | °C. | 291 | 247 | 273 | 256 | 270 |
| Crystallization peak temperature $T_{pc-2}$ in decreasing temperature at 50° C./min |  | °C. | 283 | 233 | 255 | 251 | 261 |
| Difference between $T_{pc-1}$ and $T_{pc-2}$ |  | °C. | 8 | 14 | 18 | 5 | 9 |
| Crystallization enthalpy in decreasing temperature at 20° C./min |  | J/g | 33 | 21 | 28 | 26 | 45 |
| Glass transition temperature Tg |  | °C. | 108 | 120 | 94 | 116 | 118 |
| Difference between $T_{pc-1}$ and Tg |  | °C. | 183 | 127 | 179 | 140 | 152 |
| Sulfuric acid relative viscosity ηr at 25° C. |  |  | 2.5 | 2.4 | 2.5 | 2.5 | 2.5 |
| Mw (weight average molecular weight)/Mn (number average molecular weight) |  |  | 2.8 | 2.4 | 3.1 | 2.4 | 2.8 |
| η*1/η*100 |  |  | 2.1 | 2.5 | 2.8 | 1.9 | 2.8 |
| [NH2]/([NH2] + [COOH]) |  |  | 0.64 | 0.60 | 0.60 | 0.55 | 0.55 |
| Carbon atom number/amide group number |  |  | 8.7 | 8.9 | 8.5 | 8.5 | 7.6 |
| Biomass plastic ratio |  | % | 50 | 0 | 0 | 0 | 0 |
| Physical | Tensile strength at 23° C. | MPa | 91 | 88 | 80 | 81 | 98 |

TABLE 3-continued

|  |  |  |  |  |  |  |  |
|---|---|---|---|---|---|---|---|
| properties of polyamide | Tensile strength at 120° C. | MPa | 45 | 48 | 31 | 61 | 45 |
|  | Water absorption rate | % | 2.9 | 2.4 | 2.4 | 2.4 | 5.0 |
|  | Blocking properties | % | 0 | 10 | 5 | 0 | 0 |
|  | Mold release properties | sec | 3 | 9 | 7 | 3 | 3 |
|  | Plasticizing time stability |  | 0.19 | 0.22 | 0.19 | 0.17 | 0.17 |
|  | Polymerization yield in melt polymerization |  | Good | Good | Good | Very good | Good |
| Physical properties of polyamide composition (GF50%) | Vibration fatigue resistances | MPa | 73 | 78 | 65 | 80 | 80 |
|  | Surface appearance (gloss value at 60° C.) |  | 79 | 73 | 69 | 80 | 68 |

TABLE 4

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Trans isomer ratio |  | mol % | 70 | 70 | 70 | 70 | 82 | 81 | — | — | — |
| Peak melting temperature $T_{pm-1}$ |  | ° C. | 334 | 315 | 315 | 315 | 293 | 323 | 262 | 262 | 262 |
| Peak melting temperature $T_{pm-2}$ |  | ° C. | 300 | 302 | 302 | 302 | 255 | 287 | — | — | — |
| Difference between $T_{pm}$ and $T_{pm-1}$ |  | ° C. | 6 | 5 | 5 | 5 | 39 | 36 | 1 | 1 | 1 |
| Difference between $T_{pm-1}$ and $T_{pm-2}$ |  | ° C. | 34 | 13 | 13 | 13 | 38 | 36 | — | — | — |
| Crystallization peak temperature $T_{pc-1}$ in decreasing temperature at 20° C./min |  | ° C. | 295 | 276 | 276 | 276 | 247 | 275 | 216 | 216 | 216 |
| Crystallization peak temperature $T_{pc-2}$ in decreasing temperature at 50° C./min |  | ° C. | 282 | 267 | 267 | 267 | 233 | 262 | 207 | 207 | 207 |
| Difference between $T_{pc-1}$ and $T_{pc-2}$ |  | ° C. | 13 | 9 | 9 | 9 | 14 | 13 | 9 | 9 | 9 |
| Crystallization enthalpy in decreasing temperature at 20° C./min |  | J/g | 35 | 36 | 36 | 36 | 21 | 10 | 60 | 60 | 60 |
| Glass transition temperature Tg |  | ° C. | 111 | 121 | 121 | 121 | 120 | 85 | 55 | 55 | 55 |
| Difference between $T_{pc-1}$ and Tg |  | ° C. | 184 | 155 | 155 | 155 | 127 | 190 | 161 | 161 | 161 |
| Sulfuric acid relative viscosity ηr at 25° C. |  |  | 2.4 | 2.5 | 2.1 | 2.1 | 2.4 | 2.2 | 2.2 | 2.8 | 2.7 |
| Mw (weight average molecular weight)/Mn (number average molecular weight) |  |  | 4.5 | 4.2 | 4.2 | 2.7 | 4.5 | 3.5 | 2.0 | 2.0 | 5.6 |
| η*1/η*100 |  |  | 5.8 | 5.3 | 5.4 | 2.2 | 4.7 | 3.5 | 1.0 | 1.5 | 3.5 |
| [NH2]/([NH2] + [COOH]) |  |  | 0.40 | 0.44 | 0.46 | 0.48 | 0.38 | 0.25 | 0.44 | 0.42 | 0.35 |
| Carbon atom number/amide group number |  |  | 9.0 | 8.3 | 8.3 | 8.3 | 8.9 | 8.0 | 6.0 | 6.0 | 6.0 |
| Biomass plastic ratio |  | % | 55 | 36 | 36 | 36 | 0 | 0 | 0 | 0 | 0 |
| Physical properties of polyamide | Tensile strength at 23° C. | MPa | 85 | 88 | 83 | 83 | 88 | 75 | 80 | 80 | 80 |
|  | Tensile strength at 120° C. | MPa | 50 | 65 | 59 | 59 | 48 | 45 | 25 | 25 | 25 |
|  | Water absorption rate | % | 2.3 | 2.6 | 2.6 | 2.6 | 2.4 | 4.3 | 6.5 | 6.5 | 6.5 |
|  | Blocking properties | % | 5 | 0 | 0 | 0 | 12 | 5 | 0 | 0 | 0 |
|  | Mold release properties | sec | 7 | 3 | 3 | 3 | 9 | 7 | 2 | 2 | 2 |
|  | Plasticizing time stability |  | 0.33 | 0.39 | 0.25 | 0.19 | 0.42 | 0.44 | 0.20 | 0.20 | 0.45 |
|  | Polymerization yield in melt polymerization |  | Poor | Poor | Poor | Very good | Poor | — | Very good | Very good | Poor |
| Physical properties of polyamide composition (GF50%) | Vibration fatigue resistances | MPa | 74 | 78 | 62 | 62 | 65 | 52 | 45 | 45 | 45 |
|  | Surface appearance (gloss value at 60° C.) |  | 45 | 48 | 61 | 72 | 35 | 43 | 78 | 78 | 44 |

It was confirmed that a polyamide obtained by polymerizing at least one (a) alicyclic dicarboxylic acid and a (b) diamine having 8 or more carbon atoms in any one of Examples 1 to 12 has excellent strength, high-temperature strength, low water absorbance, and plasticizing time stability and also has excellent low blocking properties and mold release properties.

It was confirmed that a polyamide composition comprising the polyamide obtained in any one of Examples 1 to 12 and the glass fiber has excellent surface appearance and vibration fatigue resistances.

Example 13

Comparative Examples 10 and 11

The following polyamides and the inorganic filler, copper compound, and metal halide were used as raw materials for polyamide compositions.
(Polyamide)
Each of the polyamides obtained in Example 2, Comparative Example 3, and Comparative Example 8 was dried under a nitrogen flow for adjusting the moisture content to about 0.2 mass %, to be used as a raw material for a polyamide composition.

(Production of Granules (1) Containing Copper Compound and Metal Halide)

A mixture of KI and ethylene bisstearyl amide was obtained by mixing 85.1 parts by mass of KI and 10 parts by mass of ethylene bisstearyl amide. The mixture was thoroughly mixed with 4.9 parts by mass of CuI, and the resultant product was granulated with a disk pelleter (F5-11-175, manufactured by Fuji Paudal Co., Ltd.) to obtain granules (1).

(Production and Physical Properties Evaluation of Polyamide Composition)

A polyamide composition was produced by using a twin-screw extruder (TEM 35, manufactured by Toshiba Machine Co., Ltd., L/D=47.6 (D=37 mφ), set temperature $T_{pm-1}$+20° C. (in this case, 300+20=320° C.), screw revolution speed 300 rpm) as follows.

The polyamide (100 parts by mass) with the moisture content adjusted as described above and the granules (1) (6.1 parts by mass) obtained as described above were fed from a top feed opening provided at the uppermost upstream portion of the twin-screw extruder. A glass fiber (GF-1), used as an inorganic filler, in a ratio (parts by mass) shown in Table 5 was fed from a side feed opening provided on a downstream side of the twin-screw extruder (in which the resin fed from the top feed opening was in a sufficiently molten state). A melt kneaded product extruded from a die head was cooled in a strand form, which was pelletized to form pellets of the polyamide composition.

The respective physical properties of the obtained polyamide composition were measured in accordance with the methods.

The tensile test was carried out at a tension speed of 5 mm/min.

The measurement results are shown in Table 5.

Example 14

Pellets of a polyamide composition were produced in the same manner as in the method described in Example 13 except that a glass fiber (GF-2) was used.

The respective physical properties of the obtained polyamide composition were measured in accordance with the methods.

The tensile test was carried out at a tension speed of 5 mm/min.

The measurement results are shown in Table 5.

TABLE 5

| | | | Example 13 | Example 14 | Comparative Example 10 | Comparative Example 11 |
|---|---|---|---|---|---|---|
| Constituent components of polyamide composition | (A) Polyamide | Kind | Example 2 | Example 2 | Comparative Example 3 | Comparative Example 8 |
| | | Parts by mass | 100 | 100 | 100 | 100 |
| | (B) Inorganic filler | Kind | GF | GF | GF | GF |
| | | Parts by mass based on 100 parts by mass of (A) | 50 | 50 | 50 | 50 |
| | Copper compound | Kind | CuI | CuI | CuI | CuI |
| | | Parts by mass based on 100 parts by mass of (A) | 0.30 | 0.30 | 0.30 | 0.30 |
| | Metal halide compound | Kind | KI | KI | KI | KI |
| | | Parts by mass based on 100 parts by mass of (A) | 5.2 | 5.2 | 5.2 | 5.2 |
| | Copper | Parts by mass based on $10^6$ parts by mass of (A) | 1000 | 1000 | 1000 | 1000 |
| | Halogen/copper | Molar ratio | 20 | 20 | 20 | 20 |
| Physical properties of polyamide composition (GF33%) | Strength half-life | Days | 56 | 59 | 51 | 47 |
| | Tensile strength retention rate after dipping | % | 94 | 94 | 93 | 45 |
| | Wear depth | μm | 11.5 | 7.7 | 15.2 | 16.0 |

As shown in Table 5, it was found that the polyamide composition of Example 13 has excellent durability and slidability.

Furthermore, it was found that the polyamide composition of Example 14 using GF having a number average fiber diameter of 7 μm has more excellent slidability.

The present application is based on a Japanese patent application filed with the Japanese patent Office on Jul. 9, 2012 (Japanese Patent Application No. 2012-153841) and a Japanese patent application filed with the Japanese patent Office on May 8, 2013 (Japanese Patent Application No. 2013-098837), whose contents are hereby incorporated by reference herein.

Industrial Applicability

The polyamide and the polyamide composition according to the present invention have industrial applicability, and can be suitably used as a molding material for various parts, such as for automobiles, electric and electronics, industrial materials, engineering materials, and daily and household articles.

The invention claimed is:

1. A polyamide comprising:
   a unit comprising at least one (a) alicyclic dicarboxylic acid; and
   a unit comprising a (b) diamine having 8 or more carbon atoms,
   wherein the polyamide satisfies the following conditions (1) and (2):
   (1) a sulfuric acid relative viscosity ηr at 25° C. is 2.3 or more; and
   (2) Mw (weight average molecular weight)/Mn (number average molecular weight) is 3.0 or less;
   wherein a ratio (η*1/η*100) of a shear viscosity (η*1) at an angular velocity of 1 rad/s to a shear viscosity (η*100) at an angular velocity of 100 rad/s is 3 or less.

2. The polyamide according to claim 1, wherein the polyamide has a peak melting temperature of $T_{pm-1}$ of 280° C. or more.

3. The polyamide according to claim 1, wherein the (a) alicyclic dicarboxylic acid is 1,4-cyclohexanedicarboxylic acid.

4. The polyamide according to claim 1, wherein a trans isomer ratio of a portion derived from the (a) alicyclic dicarboxylic acid is 65 to 80 mol %.

5. The polyamide according to claim 1, wherein Tg is 90° C. or more.

6. The polyamide according to claim 1, wherein Tg is 115° C. or more.

7. The polyamide according to claim 1, wherein in a differential scanning calorimetry based on JIS-K7121, a difference ($T_{pc-1}$–Tg) between a crystallization peak temperature $T_{pc-1}$ obtained in decreasing a temperature at 20° C./min and a glass transition temperature Tg is 140° C. or more.

8. The polyamide according to claim 1, wherein the (b) diamine having 8 or more carbon atoms is decamethylenediamine.

9. The polyamide according to claim 1, wherein a ratio between the number of carbon atoms and the number of amide groups (carbon atom number/amide group number) is 8 or more.

10. The polyamide according to claim 1, wherein in a differential scanning calorimetry based on JIS-K7121, a difference ($T_{pc-1}$–$T_{pc-2}$) between a crystallization peak temperature $T_{pc-1}$ obtained in decreasing a temperature at 20° C./min and a crystallization peak temperature $T_{pc-2}$ obtained in decreasing the temperature again at 50° C/min after measuring the crystallization peak temperature $T_{pc-1}$ is 10° C. or less.

11. The polyamide according to claim 1, wherein the polyamide is obtained by carrying out a solid phase polymerization step in at least a part of a polymerization step.

12. The polyamide according to claim 1, wherein the polyamide has a biomass plastic ratio of 25% or more.

13. A polyamide composition comprising:
    the polyamide according to claim 1; and
    a glass fiber having a number average fiber diameter of 3 to 9 μm.

14. A sliding part comprising the polyamide according to claim 1.

15. The polyamide according to claim 1, wherein the polyamide further comprises a unit comprising at least one copolymer component (c) selected from the group consisting of the following (c-1) to (c-3):
    a (c-1) dicarboxylic acid other than the (a) alicyclic dicarboxylic acid;
    a (c-2) diamine having number of carbon atoms equal to or less than that of the (b) diamine and being other than the (b) diamine; and
    a (c-3) lactam and/or aminocarboxylic acid.

16. The polyamide according to claim 15, wherein the (c-2) diamine having the number of carbon atoms equal to or less than that of the (b) diamine and being other than the (b) diamine is an aliphatic diamine having 4 to 9 carbon atoms.

17. The polyamide according to claim 15, wherein the (c-2) diamine having the number of carbon atoms equal to or less than that of the (b) diamine and being other than the (b) diamine is an aliphatic diamine having an even number of carbon atoms.

18. The polyamide according to claim 15, wherein the (c-2) diamine having the number of carbon atoms equal to or less than that of the (b) diamine and being other than the (b) diamine is at least one selected from the group consisting of 1,6-hexamethylenediamine and 2-methylpentamethylenediamine.

19. The polyamide according to claim 15, wherein a content of the (c) copolymer component is 7.5 mol % or more and 20.0 mol % or less based on 100 mol % of a total amount of all constituent components of the polyamide.

20. A polyamide composition comprising:
    the polyamide according to claim 1; and
    at least one component selected from the group consisting of an inorganic filler, a nucleating agent, a lubricant, a stabilizer, and a polymer other than the polyamide.

21. A sliding part comprising the polyamide composition according to claim 20.

22. A molded article comprising the polyamide composition according to claim 20.

23. The molded article according to claim 22, wherein the molded article is a reflector for a light emitting device.

24. The molded article according to claim 22, wherein the molded article is any of selected from the group consisting of an automobile part, an electronic part, a household appliance part, an OA equipment part, and a mobile equipment part.

25. A molded article comprising the polyamide according to claim 1.

26. The molded article according to claim 25, wherein the molded article is any of selected from the group consisting of an automobile part, an electronic part, a household appliance part, an OA equipment part, and a mobile equipment part.

27. The molded article according to claim 25, wherein the molded article is a reflector for a light emitting device.

28. A polyamide comprising:
    a unit comprising at least one (a) alicyclic dicarboxylic acid; and
    a unit comprising a (b) diamine having 8 or more carbon atoms,
    wherein the polyamide satisfies the following conditions (1) and (2):
    (1) a sulfuric acid relative viscosity ηr at 25° C. is 2.3 or more; and
    (2) Mw (weight average molecular weight)/Mn (number average molecular weight) is 3.0 or less;
    wherein in a differential scanning calorimetry based on JIS-K7121, a difference ($T_{pc-1}$–$T_{pc-2}$) between a crystallization peak temperature $T_{pc-1}$ obtained in decreasing a temperature at 20° C./min and a crystallization peak temperature $T_{pc-2}$ obtained in decreasing the temperature again at 50° C./min after measuring the crystallization peak temperature $T_{pc-1}$ is 10° C. or less.

* * * * *

UNITED STATES PATENT AND TRADEMARK OFFICE
CERTIFICATE OF CORRECTION

| | | |
|---|---|---|
| PATENT NO. | : 9,228,057 B2 | Page 1 of 1 |
| APPLICATION NO. | : 14/411174 | |
| DATED | : January 5, 2016 | |
| INVENTOR(S) | : S. Ieda et al. | |

It is certified that error appears in the above-identified patent and that said Letters Patent is hereby corrected as shown below:

In The Claims
Column 58, line 1 (claim 15, line 7) please change "having number" to -- having a number --

Signed and Sealed this
Tenth Day of May, 2016

Michelle K. Lee
*Director of the United States Patent and Trademark Office*